United States Patent
Lanzrath et al.

(10) Patent No.: US 12,528,028 B2
(45) Date of Patent: Jan. 20, 2026

(54) SYSTEM AND METHOD FOR MAKING RESIN SOLUTIONS

(71) Applicant: Lowtemp Industries LLC, Lakewood, CO (US)

(72) Inventors: Levi Garrett Lanzrath, Lakewood, CO (US); Sam Nobel, Sherman Oaks, CA (US)

(73) Assignee: Lowtemp Industries LLC, Arvada, CO (US)

( * ) Notice: Subject to any disclaimer, the term of this patent is extended or adjusted under 35 U.S.C. 154(b) by 1136 days.

(21) Appl. No.: 17/498,750

(22) Filed: Oct. 12, 2021

(65) Prior Publication Data

US 2022/0111307 A1     Apr. 14, 2022

Related U.S. Application Data

(60) Provisional application No. 63/187,712, filed on May 12, 2021, provisional application No. 63/089,943, filed on Oct. 9, 2020.

(51) Int. Cl.
*B01D 11/02*     (2006.01)
*B01F 27/112*    (2022.01)
(Continued)

(52) U.S. Cl.
CPC ...... *B01D 11/0257* (2013.01); *B01D 11/0207* (2013.01); *B01F 27/112* (2022.01);
(Continued)

(58) Field of Classification Search
None
See application file for complete search history.

(56) References Cited

U.S. PATENT DOCUMENTS 1,783,349 A * 12/1930 Watt .................... A47L 15/06
                                                   366/314
4,510,343 A *  4/1985 Sivyer ................... G01K 13/02
                                                   374/208
(Continued)

FOREIGN PATENT DOCUMENTS

CN    107376405 A  * 11/2017
DE    20102552 U1  *  6/2002  ............. B01F 35/50

OTHER PUBLICATIONS

Sell Sheet: VTS-50 Vortex Trichome Separator, Delta Separations. Icextract "ICON V-74," https://icextract.com/icon-v-74/, printed Oct. 6, 2020.

*Primary Examiner* — Jennifer A Leung
(74) *Attorney, Agent, or Firm* — Avek IP, LLC; Marshall Honeyman

(57) ABSTRACT

A system for making resin solutions includes a washer tub having an inner wall, an outer wall aligned parallel with the inner wall and spaced apart from the inner wall by a gap, and a sloped floor disposed within the inner wall. The inner wall, the outer wall and the sloped floor form a basin including a square cross-sectional shape with four rounded corners. A fluid circulation loop is located in the gap between the inner wall and the outer wall and wraps around the inner wall more than once for controlling a temperature of the washer tub. An impeller is centrally located above the sloped floor, an electric motor rotates the impeller under control of a controller, and a user interface receives instructions for various operating cycles of the impeller.

14 Claims, 19 Drawing Sheets

(51) Int. Cl.
*B01F 27/808* (2022.01)
*B01F 35/50* (2022.01)
*B01F 35/53* (2022.01)
*C11B 9/02* (2006.01)

(52) U.S. Cl.
CPC ............ *B01F 27/808* (2022.01); *B01F 35/50* (2022.01); *B01F 35/53* (2022.01); *C11B 9/025* (2013.01)

(56) References Cited

U.S. PATENT DOCUMENTS

| | | | | |
|---|---|---|---|---|
| 4,706,333 | A * | 11/1987 | Lauderbach | E05F 1/1091 |
| | | | | 16/DIG. 36 |
| 6,158,591 | A | 12/2000 | Delp | |
| 9,718,801 | B2 | 8/2017 | Love | |
| 10,933,348 | B2 | 3/2021 | Camilleri et al. | |
| 11,807,828 | B2 * | 11/2023 | Castellanos | B01D 11/0257 |
| 2011/0317511 | A1 * | 12/2011 | Dobay | B01F 27/11251 |
| | | | | 366/130 |
| 2018/0065124 | A1 * | 3/2018 | Cecchi | A23N 15/00 |
| 2019/0054393 | A1 | 2/2019 | Camilleri et al. | |
| 2021/0178285 | A1 | 6/2021 | Camilleri et al. | |
| 2021/0178286 | A1 † | 6/2021 | Camilleri | |
| 2021/0354049 | A1 * | 11/2021 | Digertt | B01D 11/0257 |

\* cited by examiner
† cited by third party

SYSTEM AND METHOD FOR MAKING RESIN SOLUTIONS

CROSS-REFERENCE TO RELATED APPLICATIONS

This application claims the benefit of U.S. Provisional Patent Application No. 63/089,943 filed on Oct. 9, 2020, and U.S. Provisional Patent Application No. 63/187,712 filed on May 12, 2021, both entitled "System and Method for Making Resin Solutions", which are herein incorporated by reference in their entirety.

BACKGROUND

1. Field

Embodiments of this disclosure relate generally to processing of plant material and more specifically to a botanical washer tub and chiller tank used for making resin solutions.

2. Description of the Related Art

Many devices for processing plant material are known. For example, U.S. Pat. Nos. 10,933,347 and 10,933,348, both to Camilleri et al., disclose a basin having a circular front half and a rounded square shape on the back half designed to produce a double vortex flow for separating trichome heads from the leaves, flowers, and stems of cannabis plants. U.S. Pat. No. 9,718,801 to Love discloses an apparatus and method for vibrational isolation of compounds from plant material. U.S. Pat. No. 6,158,591 to Delp discloses a method and apparatus for extracting plant resins that includes a washing chamber having a cone-shaped bottom that tapers downward towards a drain.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a system for making resin solutions includes a washer tub, including: an inner wall; an outer wall aligned outside of the inner wall and spaced apart from the inner wall by a gap; and a sloped floor disposed within the inner wall, wherein the inner wall, the outer wall and the sloped floor form a basin including a square cross-sectional shape with four rounded corners; a fluid circulation loop disposed in the gap between the inner wall and the outer wall, wherein the fluid circulation loop wraps around the inner wall more than once; an impeller centrally disposed above the sloped floor; an electric motor mechanically coupled with the impeller for rotating the impeller; a controller communicatively coupled with the electric motor for controlling rotation of the impeller via the electric motor; and a user interface communicatively coupled with the controller for receiving instructions including an operating cycle of the impeller.

In another embodiment, a system for making resin solutions includes a first filter tub and a filter washer tub, wherein the first filter tub and the second filter tub are cylindrical; a reservoir provided beneath the first filter tub and the second filter tub; a first drain in the bottom of the first filter tub for draining liquid into the reservoir; a second drain in the bottom of the second filter tub for draining liquid into the reservoir; a filter material disposed beneath the first drain and the second drain for filtering plant material from a wash liquid as the wash liquid is drained into the reservoir from the first filter tub and the second filter tub, respectively.

In yet another embodiment, a system for making resin solutions includes a washer tub; a reservoir provided beneath the washer tub; a drain in the bottom of the washer tub for draining liquid into the reservoir; and a removable lid on a top side of the reservoir located adjacent the washer tub.

BRIEF DESCRIPTION OF THE DRAWINGS

Illustrative embodiments of the present disclosure are described in detail below with reference to the attached drawing figures, which are incorporated by reference herein and wherein.

Figure 1:
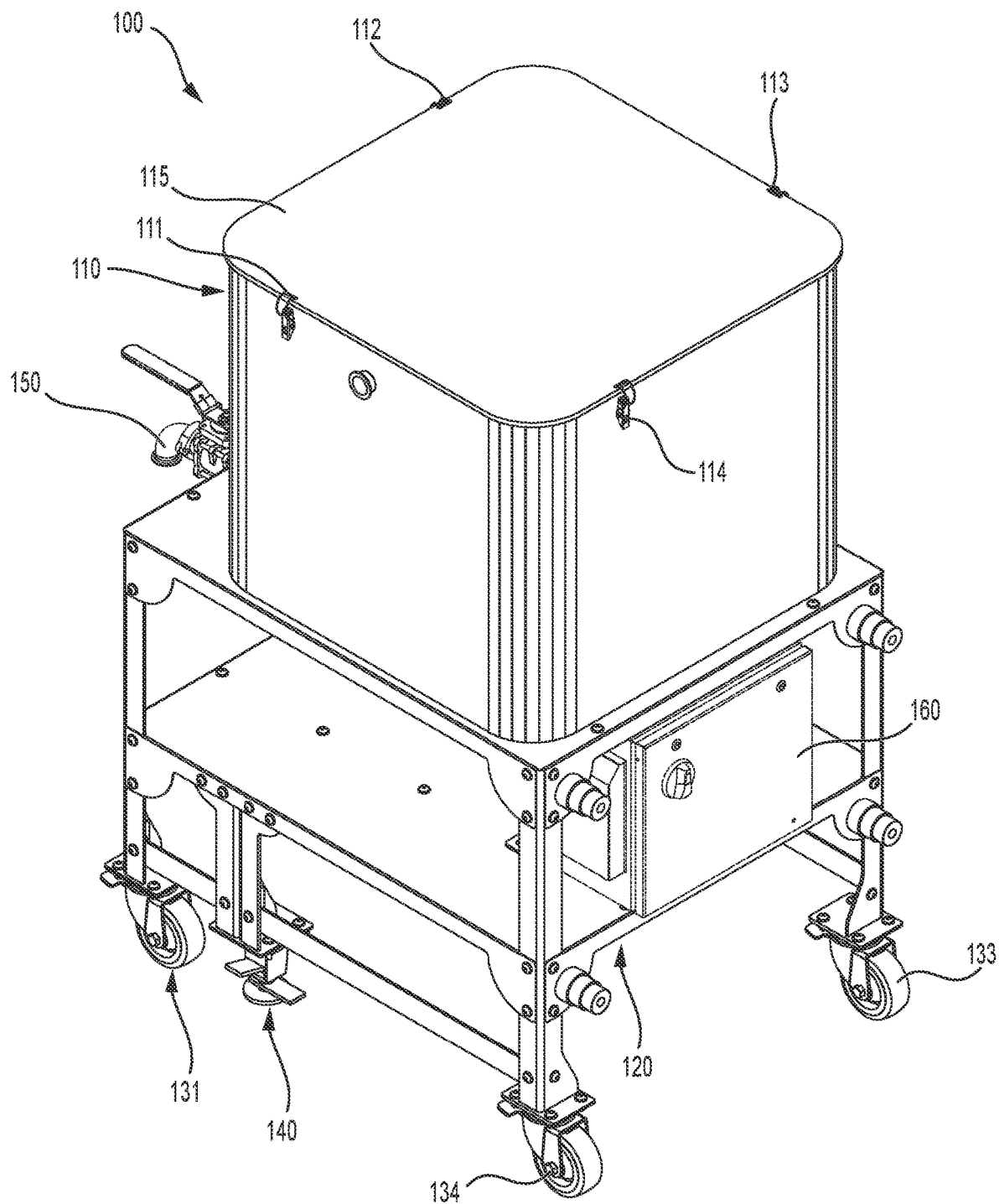
FIG. 1 shows a perspective view of a system for making resin solutions, in an embodiment.

The drawing figures do not limit the invention to the specific embodiments disclosed and described herein. The drawings are not necessarily to scale, emphasis instead being placed upon clearly illustrating the principles of the disclosure.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Resin from glandular trichomes of the cannabis plant may be harvested in various ways. However, many prior methods are inefficient, labor intensive, and/or produce a low quality product due to inclusion of many plant material contaminants.

Embodiments of the present disclosure provide a washer tub for breaking down plant material in a liquid (e.g., aqueous) solution. Once the plant material is broken apart, fractions of plant material may be separated from the solution in a downstream process (e.g., based on size using a series of filters having progressively smaller pores). In certain embodiments, temperature control is provided such that the solution is maintained at a predetermined temperature.

Figure 2:
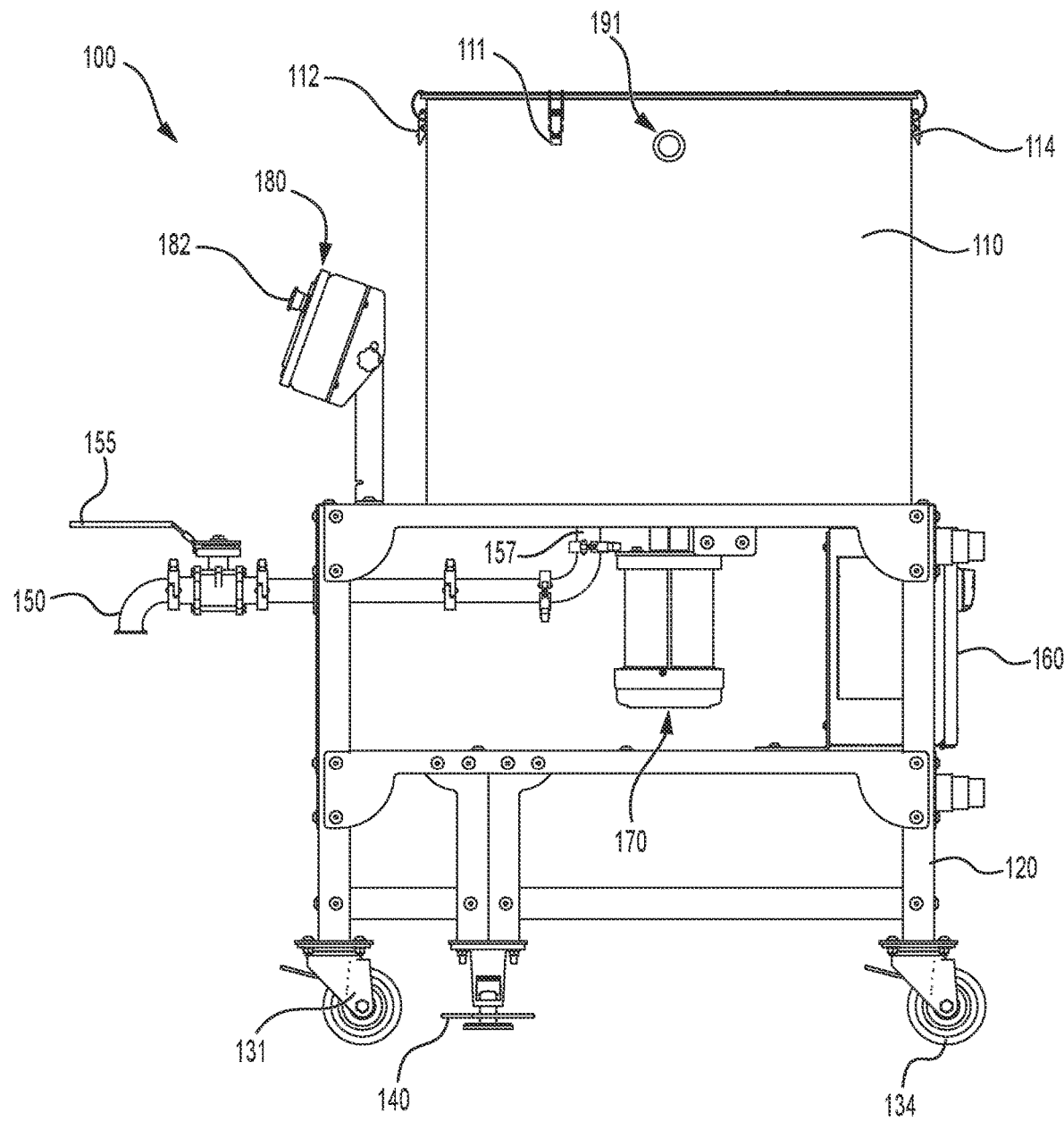
FIG. 2 shows a side view of the system for making resin solutions of FIG. 1.
Figure 3:
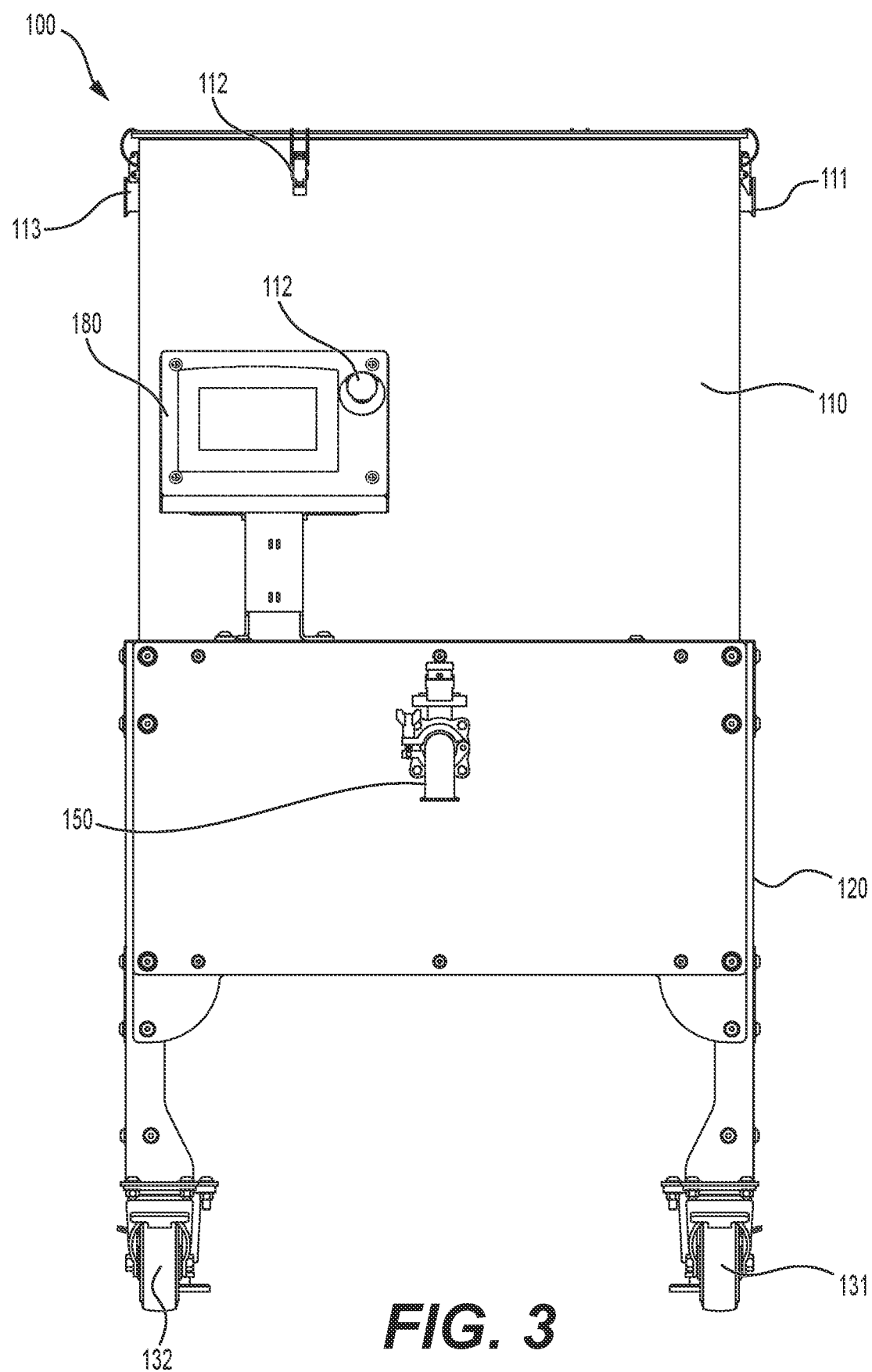
FIG. 3 shows a front view of the system for making resin solutions of FIG. 1.
Figure 4:
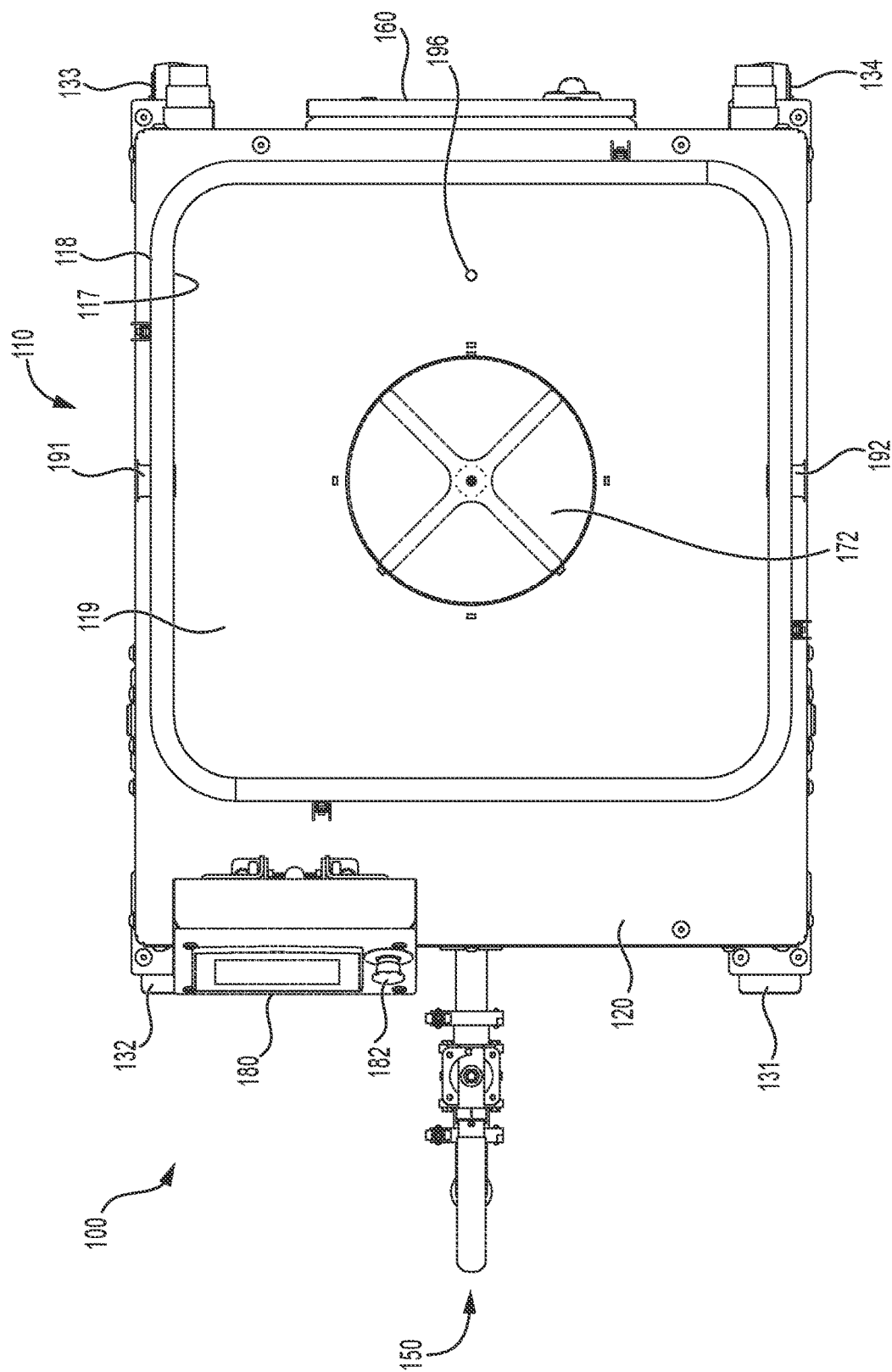
FIG. 4 shows a top-down view of the system for making resin solutions of FIG. 1.

FIG. 1 shows a perspective view of an exemplary system 100 for making resin solutions; FIG. 2 shows a side view of system 100; FIG. 3 shows a front view of system 100; and, FIG. 4 shows a top-down view of system 100. FIGS. 1-4 are best viewed together with the following description.

A washer tub 110 is configured as a botanical washer tub for separating plant material in an aqueous solution. Washer tub 110 is for example a basin having a motorized impeller for stirring contents of the basin. In certain embodiments, washer tub 110 is made of stainless steel. Washer tub 110 may be formed in various sizes. In a preferred embodiment, washer tub has a capacity of seventy-five gallons. Washer tub 110 preferably has a rounded square shape in which the overall cross-sectional shape when viewed from above is that of a square, and the corners of the square are substantially rounded. In certain embodiments, the corners of washer tub 110 are formed via a bump-in manufacturing process in which rounded corners are formed from square shaped walls. A cover 115 is attached to a top of washer tub 110. Cover 115 is made of a substantially transparent material such as a clear plastic (e.g., acrylic/plexiglass). Cover 115 may be secured to the top of washer tub 110 via a plurality of latching mechanisms 111, 112, 113, 114, which are e.g., clasps. Cover 115 may include a gasket for forming a water-tight seal with a top edge of washer tub 110.

A stand 120 provides a structure for supporting washer tub 110 and other components of system 100 described below. Stand 120 may be made of any suitable strong material. In certain embodiments, stand 120 is made of stainless steel. In some embodiments, stand 120 is configured as a cart having wheels. As depicted in FIGS. 1-4, wheels 131, 132, 133, 134 may be mechanically coupled to the bottom of stand 120 enabling system 100 to be moveable. In certain embodiments, wheels 131-134 are swivel caster type wheels, such that wheels 131-134 may swivel, thereby enabling system 100 to be rolled in various directions. In some embodiments, wheels 131-134 each include a locking mechanism enabling the wheels to be locked for preventing rolling. An adjustable-height floor lock 140 provides an additional mechanism for securing system 100 to the floor. In some embodiments, more than one adjustable-height floor lock 140 is included in system 100.

A size of the washer tub 110 and stand 120 is designed to fit through a normal doorway. For example, the overall height of system 100 is less than 62 inches tall, and the widest portion of system 100 is less than 33.5 inches wide.

A discharge pipe 150 fluidly couples to a drain 157 located at the bottom of washer tub 110. A handle 155 enables a user to control a mechanical valve for opening and closing discharge pipe 150. Discharge pipe 150 may be used to discharge solutions of plant material from washer tub 110 via the exit spout. The solutions of plant material may then be transferred to a filtration system or another container for downstream processing.

A motor 170 (see FIG. 2) provides mechanical rotation of an impeller 172 (see FIG. 4) located inside washer tub 110. Motor 170 is for example a 1-horsepower electric motor capable of rotating impeller 172 at a wide range of speeds between 0-rpm and 1720-rpm. Typically, motor 170 is operated at less than 1000-rpm, and preferably between about 100-rpm to about 400-rpm. Motor 170 is mechanically coupled (e.g., bolted) to an underside of washer tub 110 (see FIG. 2). A drive shaft 174 (see FIG. 7) extends from motor 170 through a hole in the bottom of washer tub 110 (see FIG. 5) for mechanically coupling with impeller 172 (see FIG. 7). In certain embodiments, motor 170 includes an optional gear box for providing a desired torque output and speed of rotation to impeller 172. In an embodiment, the gear box provides a 2-to-1 gear ratio from the motor.

As depicted in FIG. 4, impeller 172 is located in the bottom of washer tub 110. An inner wall 117 is separated by a gap from an outer wall 118 to form the double-walled sides of washer tub 110. In embodiments, inner wall 117 is aligned parallel with outer wall 118 such that both the inner wall 117 and outer wall 118 have a square cross-sectional shape with rounded corners.

In certain embodiments, (see e.g., FIG. 7) the bottom of washer tub 110 may include an upper floor 119 and a lower floor 121. Upper floor 119 may be a false bottom that is removable, with lower floor 121 being sealed (e.g., welded) to inner wall 117 for forming a water-tight vessel. Alternatively, upper floor 119 is sealed (e.g., welded) to inner wall 117 to form the bottom of the washer tub 110. Upper floor 119 and lower floor 121 may each be made of a single panel or sheet of stainless steel. A shape of upper floor 119 may be angled downwardly towards drain 157 as opposed to being substantially flat. Likewise, a shape of lower floor 121 may be angled downwardly towards drain 157 instead of being substantially flat. In this manner, the floor (e.g., upper floor 119 and/or lower floor 121) is configured such that liquid inside washer tub 110 flows via gravity downwardly to drain 157, which is located beneath impeller 172. In certain embodiments, upper floor 119 and/or lower floor 121 have a concave curvature such that liquid flows downwardly to drain 157. Upper floor 119 and/or lower floor 121 may be curved using a bump out manufacturing technique in which a flat piece of metal is bent into shape to provide the desired flow of liquid towards drain 157. Alternatively, upper floor 119 and/or lower floor 121 may be substantially flat in some embodiments.

Impeller 172 is for example a semi-closed impeller having a solid back wall and a plurality of fins. The back wall may have a slightly angled shape for matching the slope of upper floor 119. In certain embodiments, impeller 172 is machined from a block of aluminum or other material (e.g., steel, plastic, or urethane) and includes a central hole for receiving drive shaft 174 coupled to motor 170. The machined aluminum part may be treated with a hard anodizing surface coating to make the outside of impeller 172 hardened like steel. By machining the part, impeller 172 can be properly balanced so as to avoid wear on all of the moving parts coupled with impeller 172 including motor 170. The fins on a top side of impeller 172 may be substantially rounded so as to avoid having sharp edges. In this manner, impeller 172 is configured to stir the contents of washer tub 110 without damaging the plant material. Impeller 172 is easily removable (e.g., via a nut on the end of a threaded shaft) enabling the impeller to be swapped for a different (e.g., more aggressive) type of impeller.

In embodiments, impeller 172 is a no-shear impeller in which blades of the impeller have sloped walls to provide a very low drag coefficient e.g., about 65 degrees in embodiments. This enables operation of impeller 172 using 110-Volt AC electrical power rather than requiring 220-Volt AC electrical power.

Electronics for a controller 160 are housed on stand 120. Controller 160 is configured for receiving inputs from a user for controlling operation of system 100 and for presenting information that is output from system 100 via a user interface 180 (see FIGS. 2-3). Controller 160 is further described below in connection with FIG. 8.

Referring again to FIG. 4, inner wall 117 and outer wall 118 form the double-walled sides of washer tub 110. Optionally, the space between inner and outer walls 117, 118 may be filled with an insulating material (e.g., spray foam). In some embodiments, a fluid circulation loop may be provided between inner and outer walls 117, 118. Likewise, the space between upper and lower floors 119, 121 (see FIG. 7) may be filled with an insulating material or used to house the fluid circulation loop. The fluid circulation loop may include tubing and/or piping routed in a serpentine pattern between the inner and outer walls 117, 118 along all four sides of washer tub 110, and optionally between the upper and lower floors 119, 121 as well. In certain embodiments, space between individual loops of the fluid circulation loop may be filled with insulating material, either between the inner and outer walls 117, 118 or between the upper and lower floors 119, 121, or both.

A first port 191 and a second port 192 fluidly couple to the fluid circulation loop. The fluid circulation loop is located in the gap between the inner wall 117 and the outer wall 118 and is configured to receive a fluid for adjusting a temperature of the washer tub 110. For example, the fluid circulation loop may be fluidly coupled to a temperature control device configured to adjust the temperature of the fluid to a desired temperature. The desired temperature may be input by a user via the user interface 180, for example, and received by the controller 160.

In certain embodiments, the fluid circulation loop is used to pass a cooling fluid, such as a glycol and water mixture, that is cooled to a predetermined temperature prior to introduction to the fluid circulation loop. The cooling fluid may be cooled using a dedicated chiller (not shown), such as a portable chiller from Thermal Care, Inc. (Niles, IL). The chiller may be used to set the predetermined temperature, and the chiller may include a fluid pump for pumping the cooling fluid through the fluid circulation loop and for controlling the flow rate. In this manner, washer tub 110 may be actively cooled (e.g., to below room temperature) which may help preserve the resins extracted from the plant material. At a preferred temperature of about 0° C. to about 1° C., the trichome head becomes brittle, which causes it to easily snap off of the stalk without damaging the trichome. Use of the fluid circulation loop obviates the need for ice to cool washer tub 110, as is commonly done, and also enables more accurate control of the temperature of washer tub 110.

A temperature sensor 195 (see FIG. 12) may be disposed in a thermal well 196 located along an interior surface of washer tub 110 (see FIGS. 4 and 5) and communicatively coupled with controller 160 (see FIG. 8) for providing internal temperature data for washer tub 110. Temperature sensor 195 is for example a thermocouple or a resistance temperature detector (RTD). Thermal well 196 is for example a protrusion in upper floor 119 formed by a bump-out process to provide a recess accessed from below upper floor 119, as further described below in connection with FIG. 5. In this manner, upper floor 119 avoids having any extra holes that need to be sealed to prevent leaks.

Figure 5:
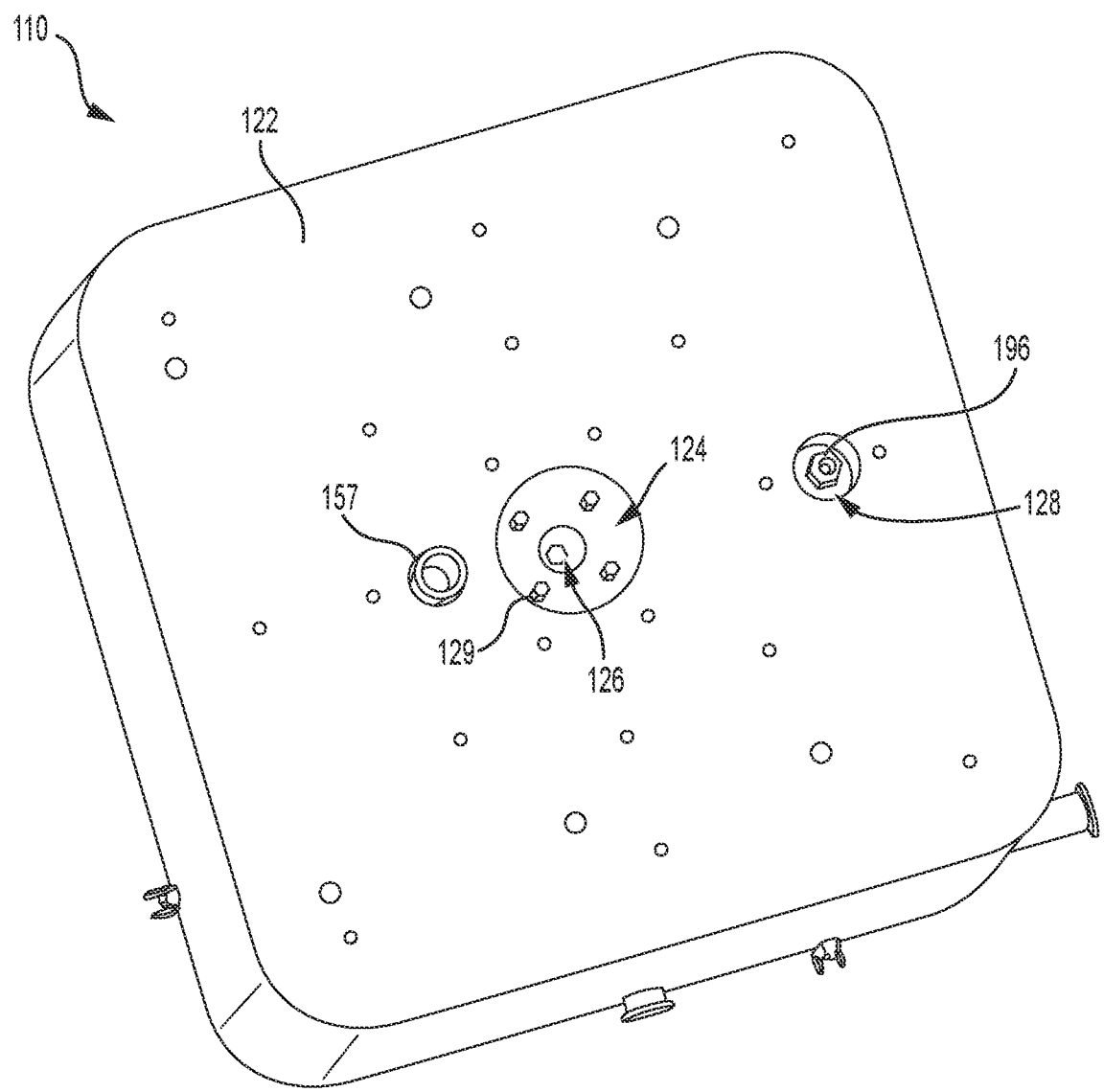
FIG. 5 shows a perspective view of a washer tub used with the system of FIG. 1, in an embodiment.

FIG. 5 is a bottom perspective view of washer tub 110. Beneath a bottom of washer tub 110, a bottom panel 122 is provided. Bottom panel 122 is a separate panel from upper floor 119, which provides additional rigidity to the structure of washer tub 110. A space separates upper floor 119 from bottom panel 122, which increases temperature retention of washer tub 110. Bottom panel 122 is configured for mounting to stand 120, e.g., with mounting holes for receiving fasteners (e.g., bolts). A large-diameter hole 124 in bottom panel 122 is configured for receiving motor 170. A small-diameter hole 126 in upper floor 119 is configured for receiving a shaft that mechanically couples motor 170 with impeller 172. Seals are provided between the motor shaft and upper floor 119 to maintain a water-tight seal of washer tub 110. A plurality of bolts 129 are provided for mounting motor 170 to upper floor 119. Not all bolts 129 are enumerated in FIG. 5 for clarity of illustration. As depicted in FIG. 5, thermal well 196 may include a fitting for securing temperature sensor 195 thereto. A hole 128 is provided in bottom panel 122 for accessing thermal well 196.

Figure 6:
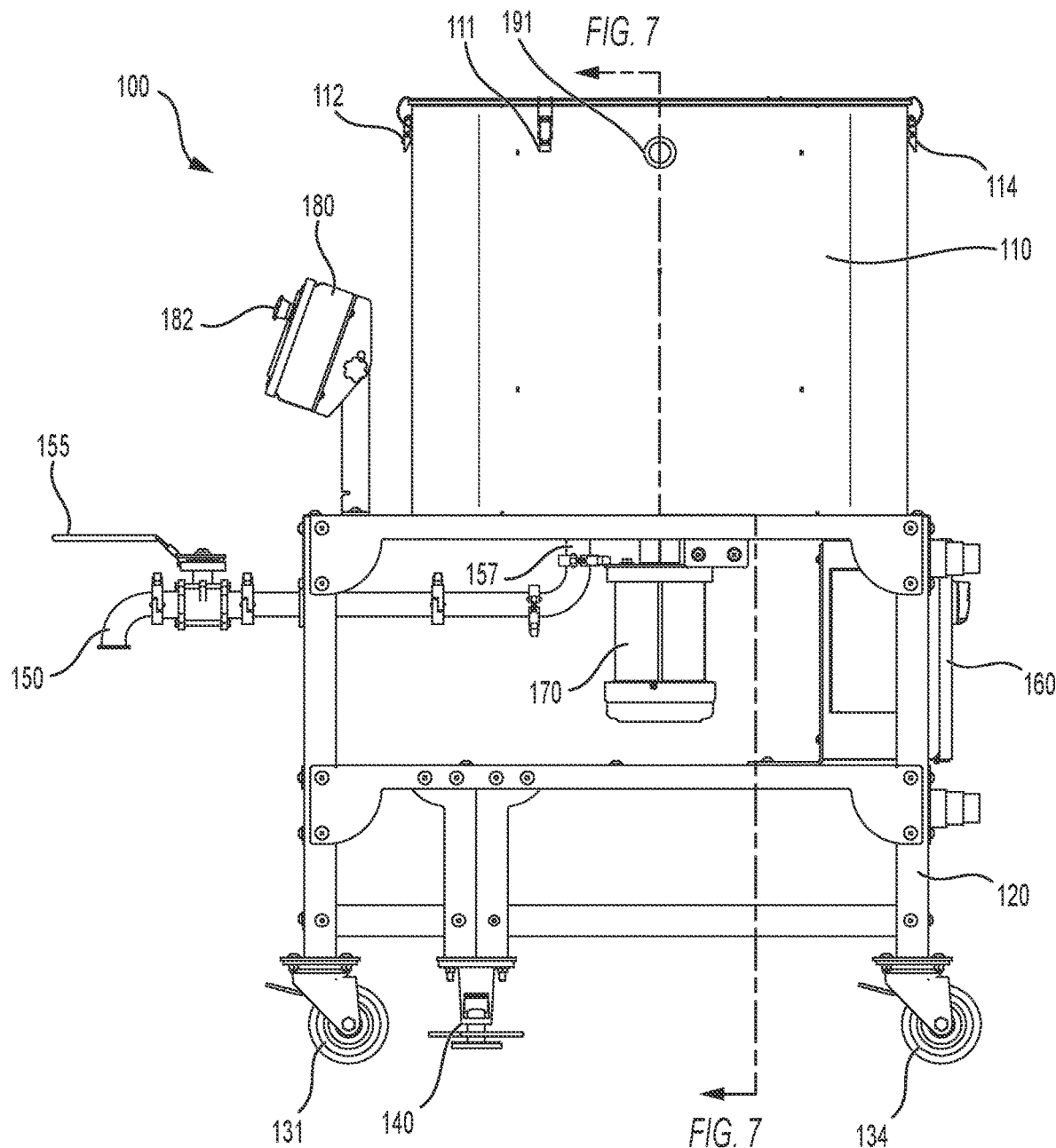
FIG. 6 is a side view of the system for making resin solutions like FIG. 2, with a line A-A' depicted.
Figure 7:
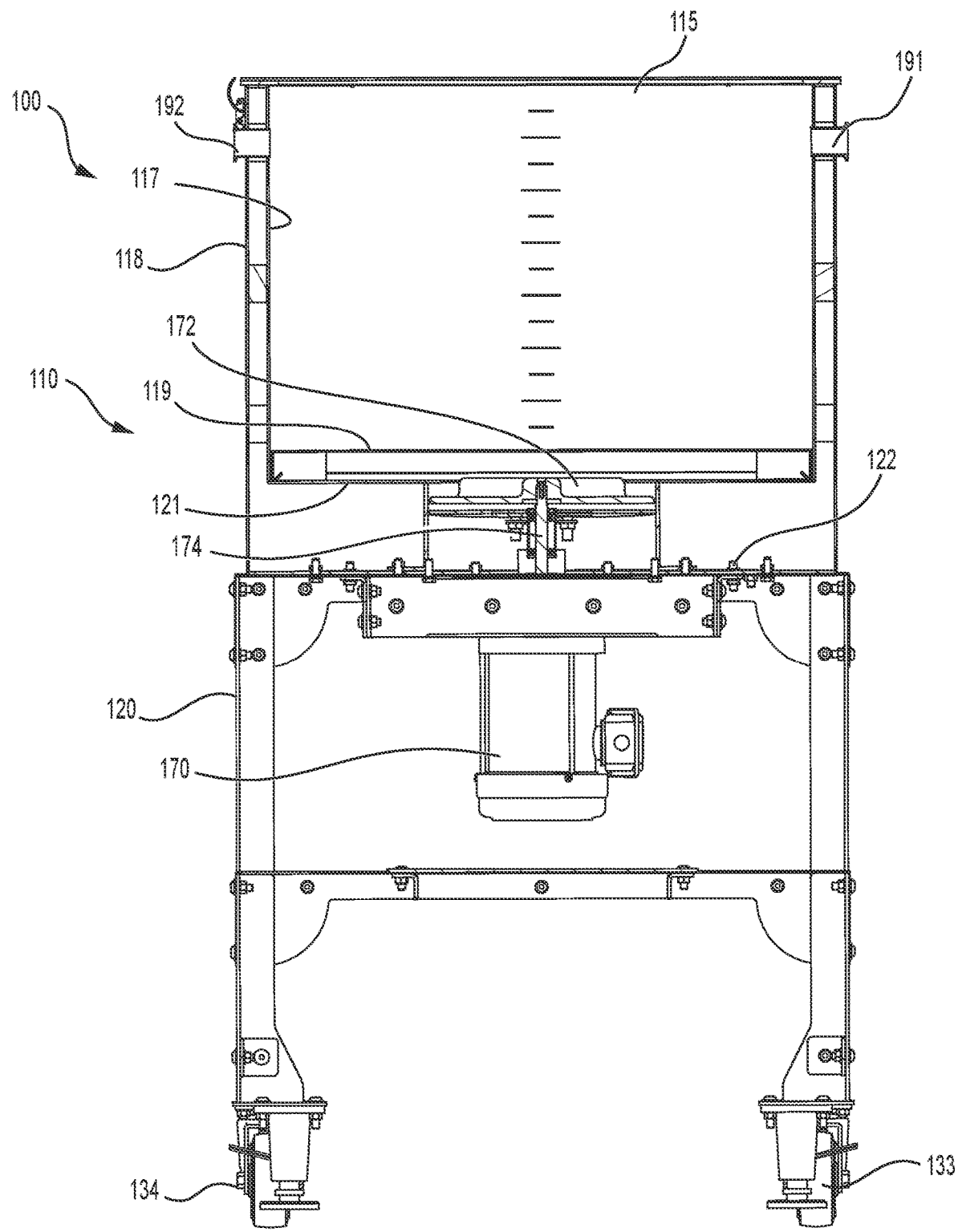
FIG. 7 is a cross-sectional view taken along line A-A' of FIG. 6.

FIG. 6 is a side view of the system for making resin solutions like FIG. 2, with a line A-A' depicted. FIG. 7 is a cross-sectional view taken along line A-A' in FIG. 6. From the cross-sectional view of FIG. 7, the double-walled floor is viewable. Specifically, upper floor 119 is located above lower floor 121. Also viewable in the cross-sectional view of FIG. 7 is the drive shaft 174 coupled to impeller 172. A height of impeller 172 is adjustable along drive shaft 174 such that a vertical position of impeller 172 may be changed with respect to upper and lower floors 119, 121. For example, upper floor 119 may be a false bottom that is removable such that impeller 172 is below the upper floor 119. In this embodiment, lower floor 121 is sealed with inner wall 117 for forming a water-tight vessel.

In some embodiments, the space between the upper and lower floors 119, 121 may be used to provide an insulating material (e.g., spray foam) or to house tubing/piping of the fluid circulation loop described above. In this manner the floor of washer tub 110 is either insulated to maintain the desired temperature provided by the fluid circulation loop between inner and outer walls 117, 118, or the fluid circulation loop extends through the double-walled floor for controlling the temperature within washer tub 110. For these embodiments, a vertical position of impeller 172 is adjusted such that impeller 172 is above upper floor 119 (not shown).

Figure 8:
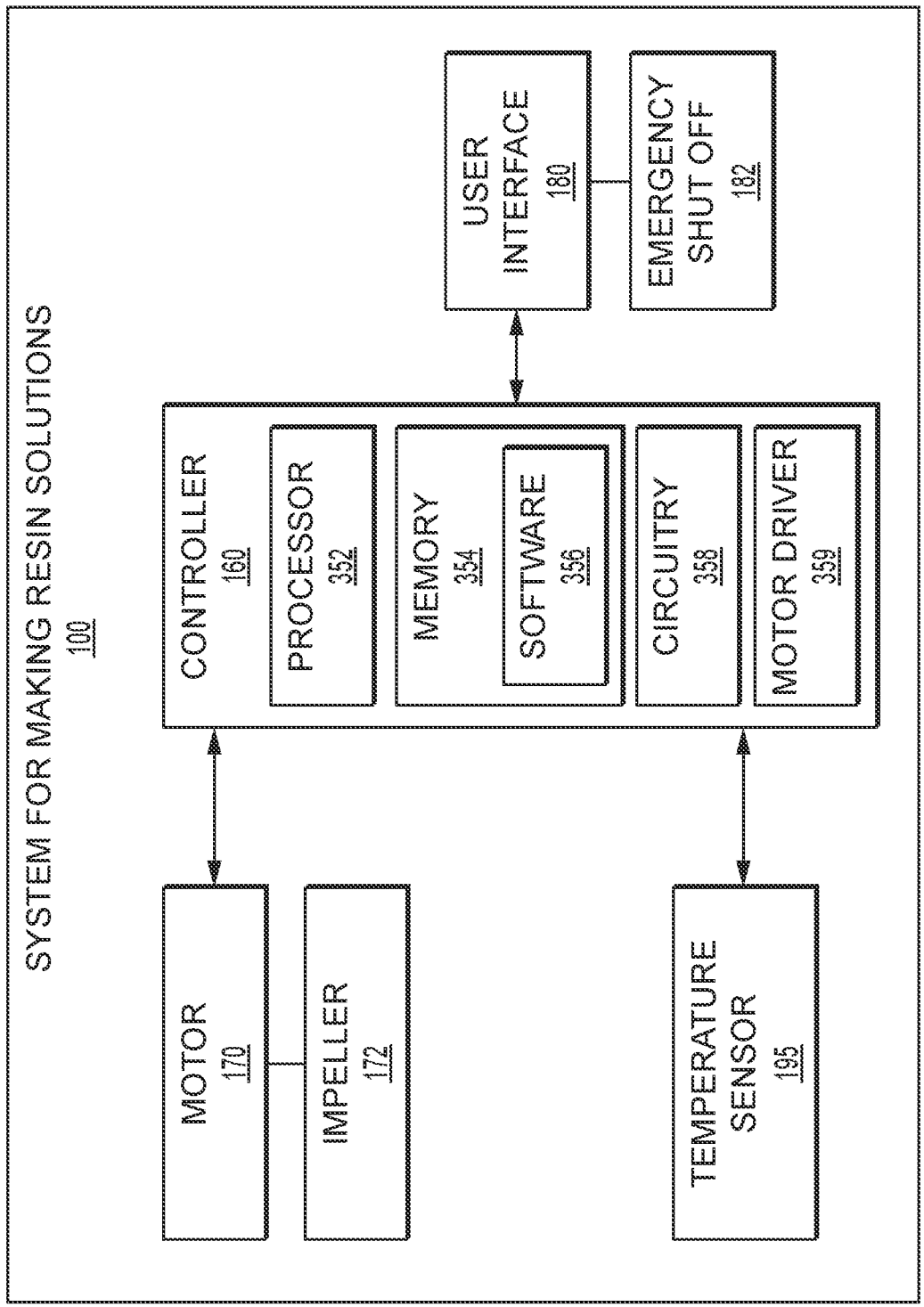
FIG. 8 is a block diagram showing components of a control panel used with the system of FIG. 1, in an embodiment.

FIG. 8 is a block diagram showing components of controller 160. Controller 160 may include one or more microcontrollers, microprocessors, and/or programmable logic controllers (PLCs) and one or more printed circuit boards (PCBs) communicatively coupled with one another and with motor 170. In the embodiment depicted in FIG. 8, controller 160 includes a memory 354 having a non-transitory medium for storing software 356, and a processor 352 for executing instructions of software 356. Memory 354 may be used to store information used by controller 160, including but not limited to instructions, algorithms, lookup tables, etc. Circuitry 358 includes wires and PCB traces for communicatively and electrically coupling components of controller 160 with motor 170. For example, circuitry 358 includes an electrical connector that provides electrical power and ground, and another electrical connector that transmits an input signal from controller 160 and returns feedback from motor 170 via a motor driver 359. In some embodiments, circuitry 358 includes a master circuit board that incorporates circuitry from motor 170 and circuitry from controller 160.

In some embodiments, motor 170 includes motor driver 359 (see FIG. 8) which activates the motor and accurately controls the speed and start/stop of motor 170. Motor driver 359 may be communicatively coupled with controller 160, or included with controller 160, without departing from the scope hereof. For example, motor driver 359 may be an integrated microcontroller/microprocessor included in the master circuit board or directly integrated with motor 170. Feedback from motor driver 359 may transmit data signals providing information about the motor e.g., temperature, torque, position, and speed of motor 170. For example, temperature information may be stored in memory 354 and used by controller 160 to prevent overheating of motor 170. Controller 160 may determine a torque output based on an amount of electrical current being drawn by motor 170 together with the use of an algorithm and/or a lookup table stored in memory 354. Controller 160 is not limited by the materials from which it is formed or the processing mechanisms employed therein and, as such, may be implemented via semiconductor(s) and/or transistors (e.g., electronic integrated circuits (ICs)), and so forth.

A user interface 180 is located on stand 120 adjacent washer tub 110 (see FIGS. 2-4) and communicatively coupled with controller 160 for enabling user inputs. For example, controller 160 accepts user input and provides signals to motor 170 for activation and setting a rotation speed of the impeller. In certain embodiments, user interface 180 includes one or more buttons, switches, and/or dials to transmit an input signal to the motor driver. An emergency shut off button 182 may be a physical button (see e.g., FIGS. 2-4) located prominently on user interface 180 for rapidly shutting off motor 170. User interface 180 may include a display for displaying information about system 100, including but not limited to, a speed (e.g., in rpm) and rotation direction of impeller 172, a total run-time, a duration for each direction of rotation (e.g., clockwise or counter-clockwise), a rest duration (e.g., for an optional period of rest within a cycle between switching directions), a number of cycles, a current temperature reading based on temperature data from temperature sensor 195, batch numbers, strain information, etc. User interface 180 may be configured to present a menu for a user to select an operating cycle and other inputs (e.g., a gain, speed, direction, duration, cycle times, rest periods, recipe features, saved programs, etc.) for controlling motor 170 via programmed instructions stored in memory 354. In certain embodiments, user interface 180 is a touch screen display device configured for receiving touch indications by the user.

Advantages of system 100 include providing a user friendly and accurate temperature control system for chilling washer tub 110. System 100 also includes an impeller configured for stirring contents of washer tub 110 without damaging plant material. User interface 180 provides a user-friendly menu for selecting various operating parameters (e.g., saved protocols) and for displaying information including an internal temperature of washer tub 110. The slightly sloped floor of washer tub 110 facilitates draining of the contents of washer tub 110 without disrupting rotational flow of liquid in washer tub 110. Impeller 172 is made of a lightweight material thereby avoiding the need for an oversized motor. The clear plastic lid enables the contents of washer tub 110 to be viewable during operation of system 100.

Figure 9:
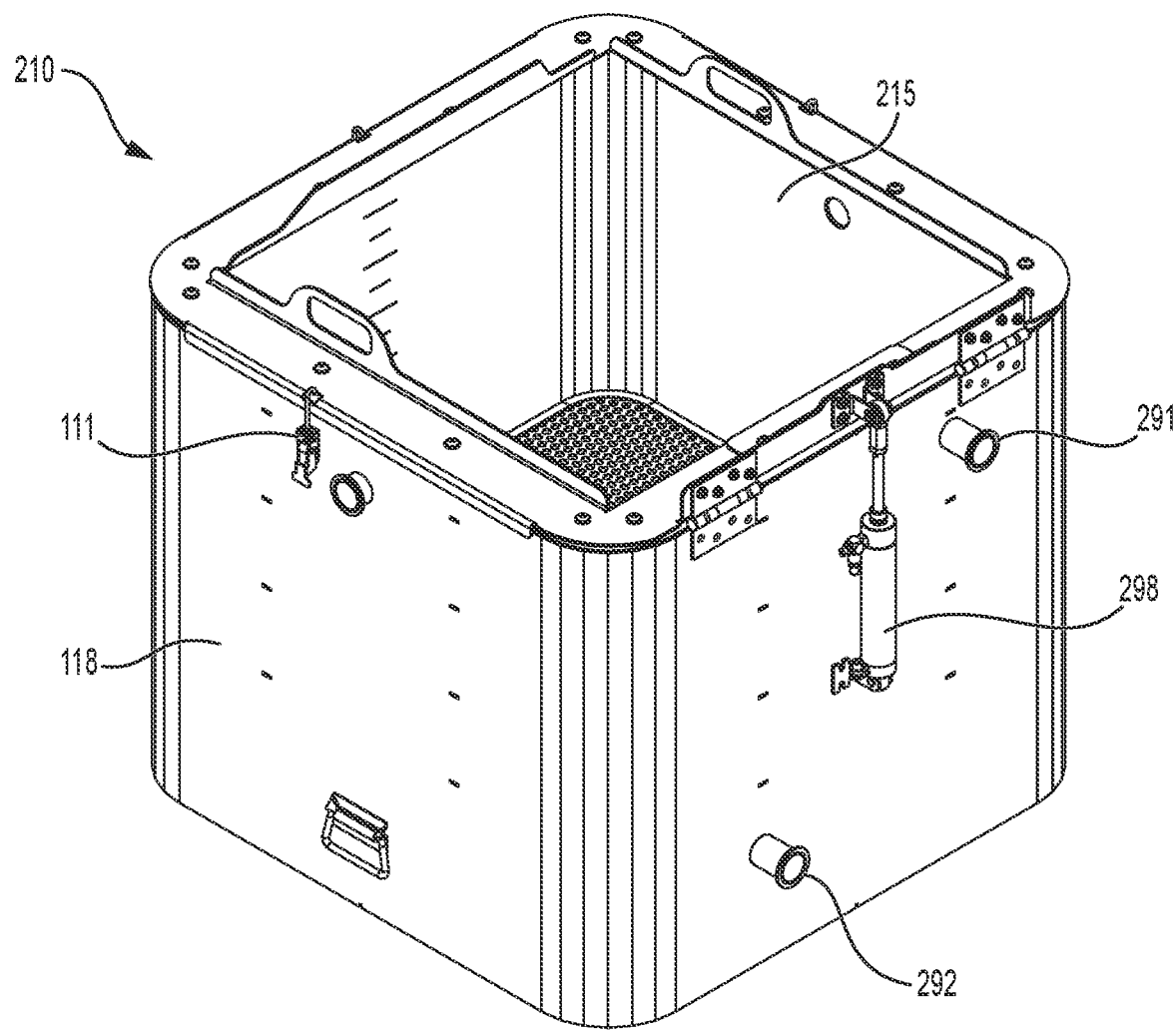
FIG. 9 shows a perspective view of a washer tub for making resin solutions, in an embodiment.
Figure 10:
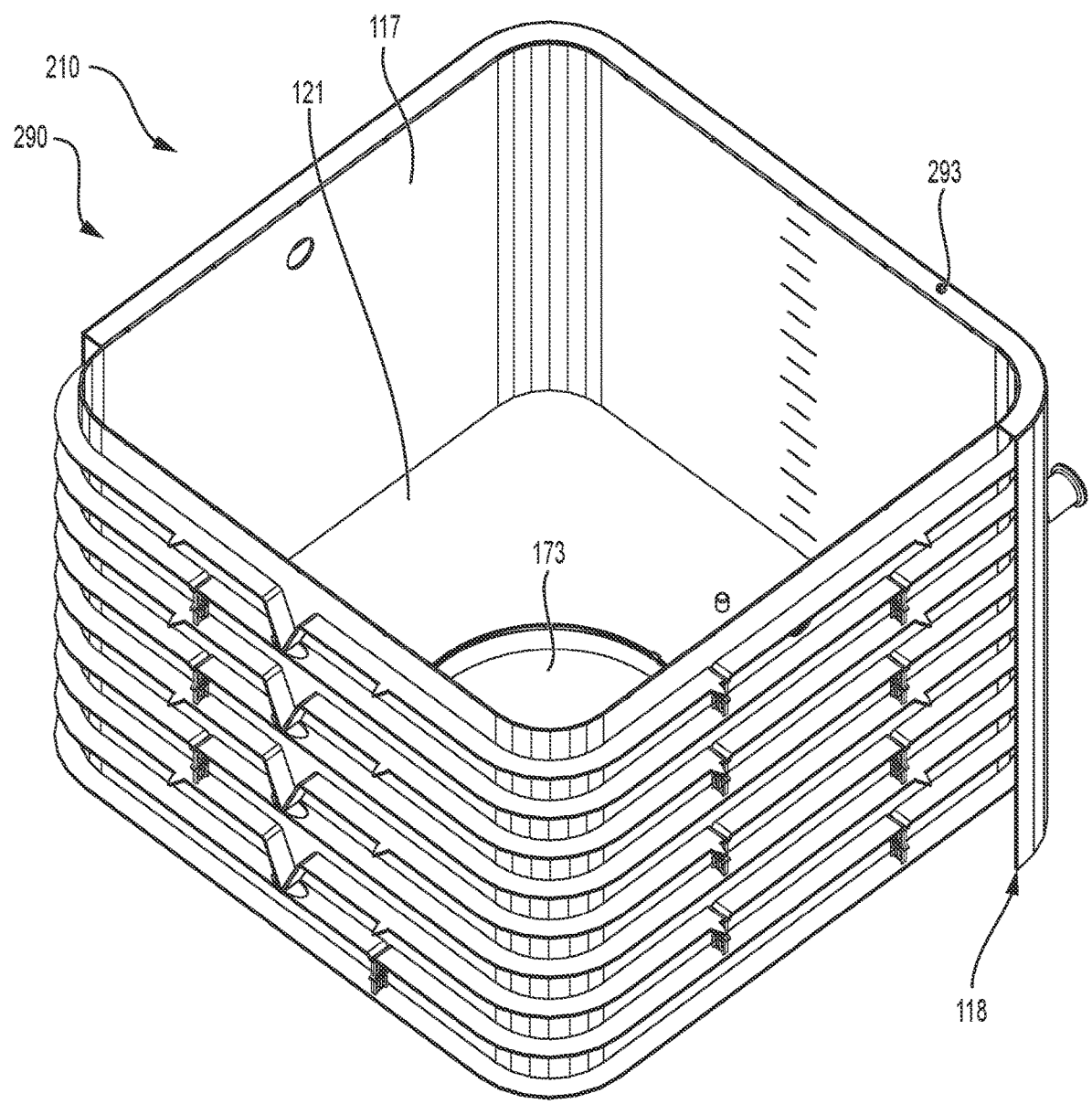
FIG. 10 shows an exemplary fluid loop arrangement for use in the washer tub of FIG. 9.
Figure 11:
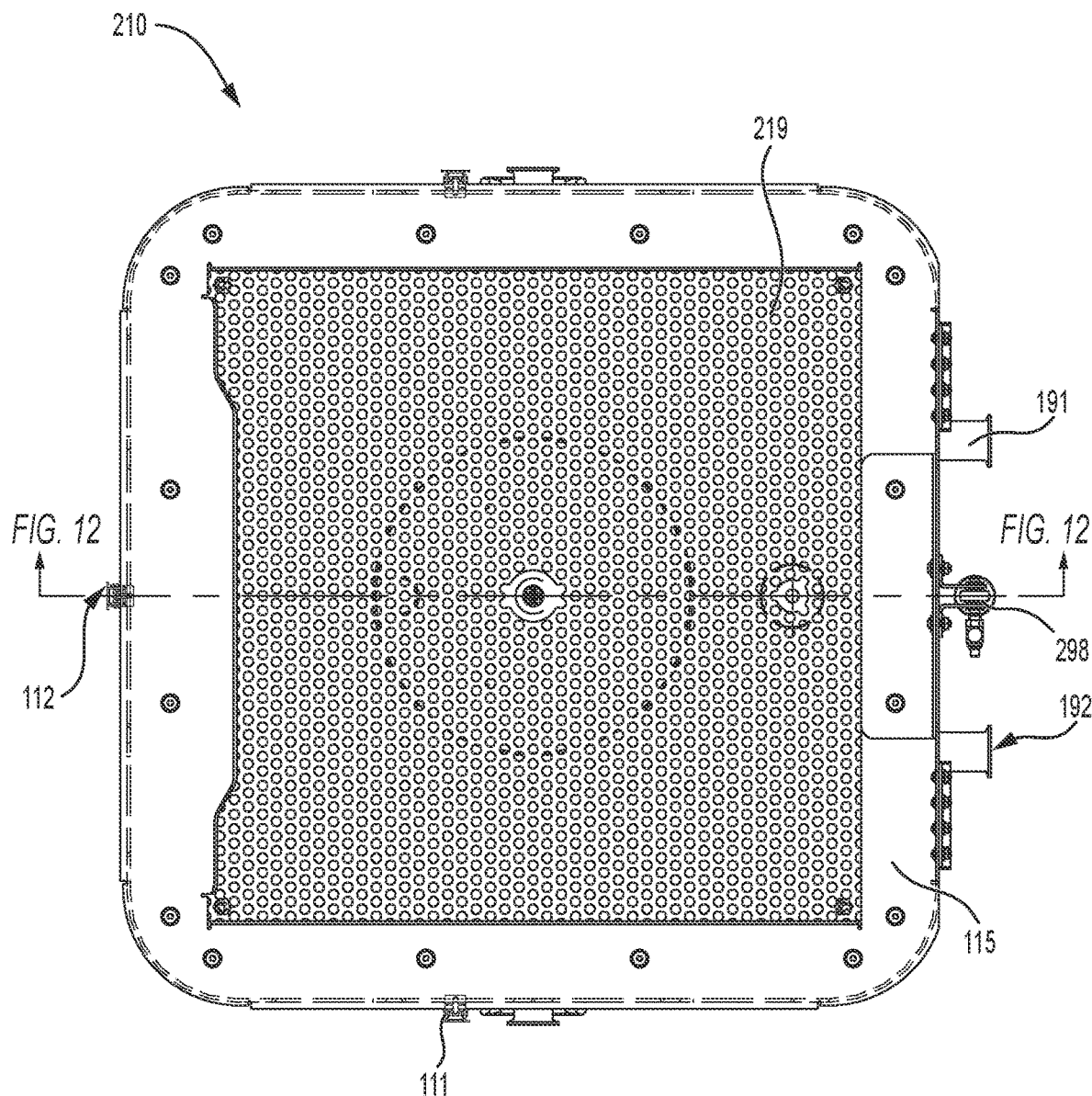
FIG. 11 shows a top-down view of the washer tub of FIG. 9.
Figure 12:
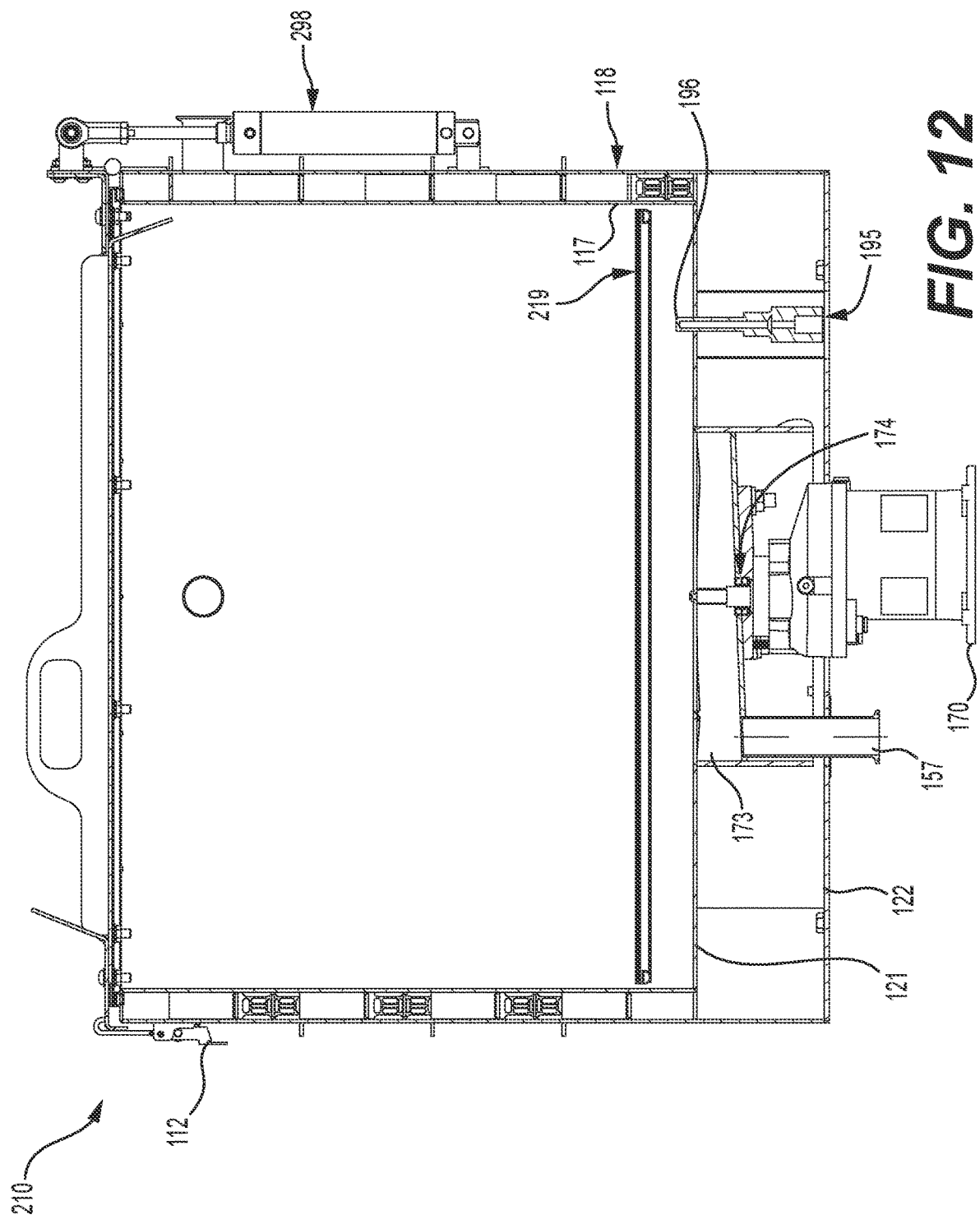
FIG. 12 shows a side view of the washer tub of FIG. 9.
Figure 13:
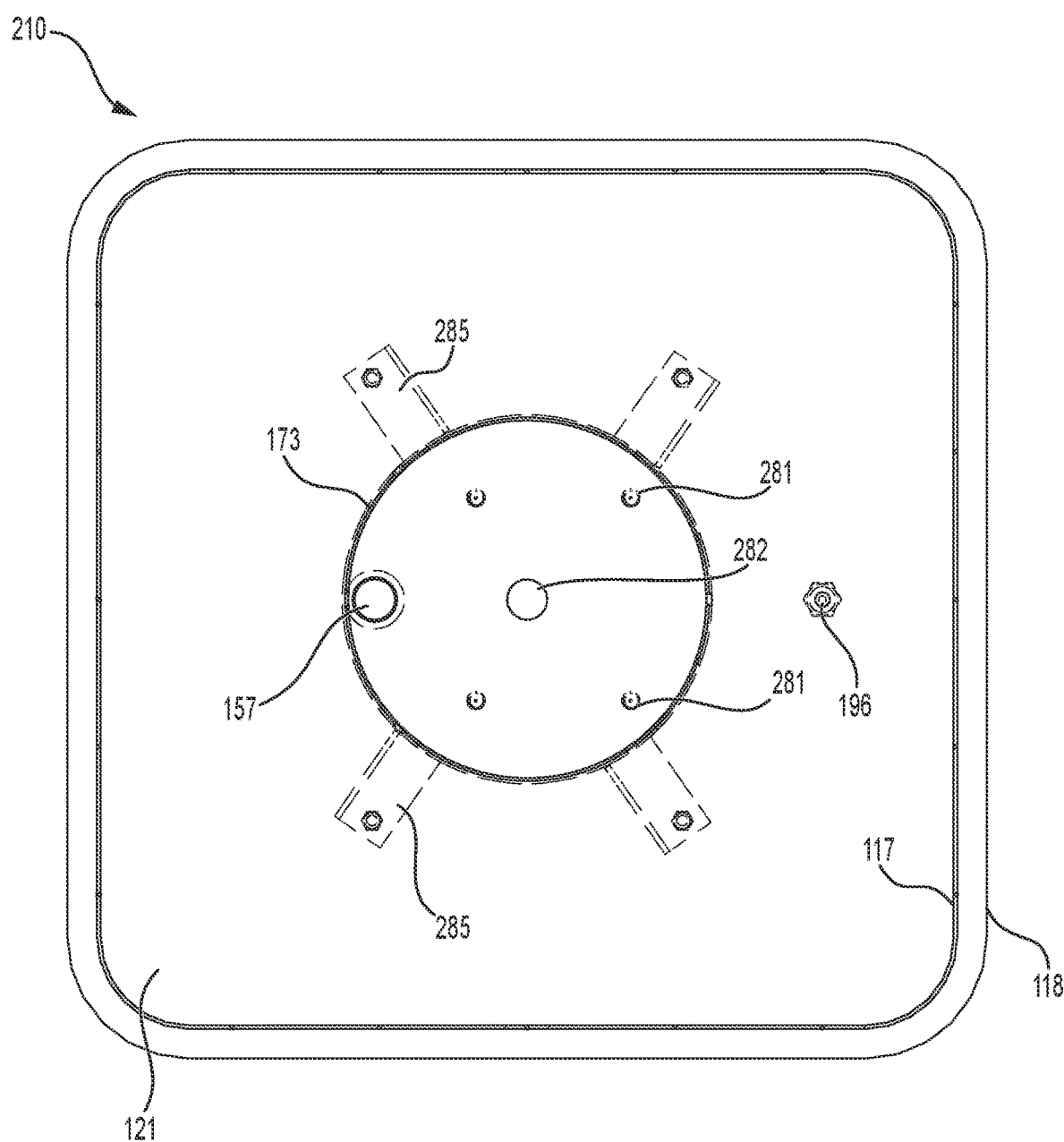
FIG. 13 shows a bottom view of the washer tub of FIG. 9 without a motor installed.
Figure 14:
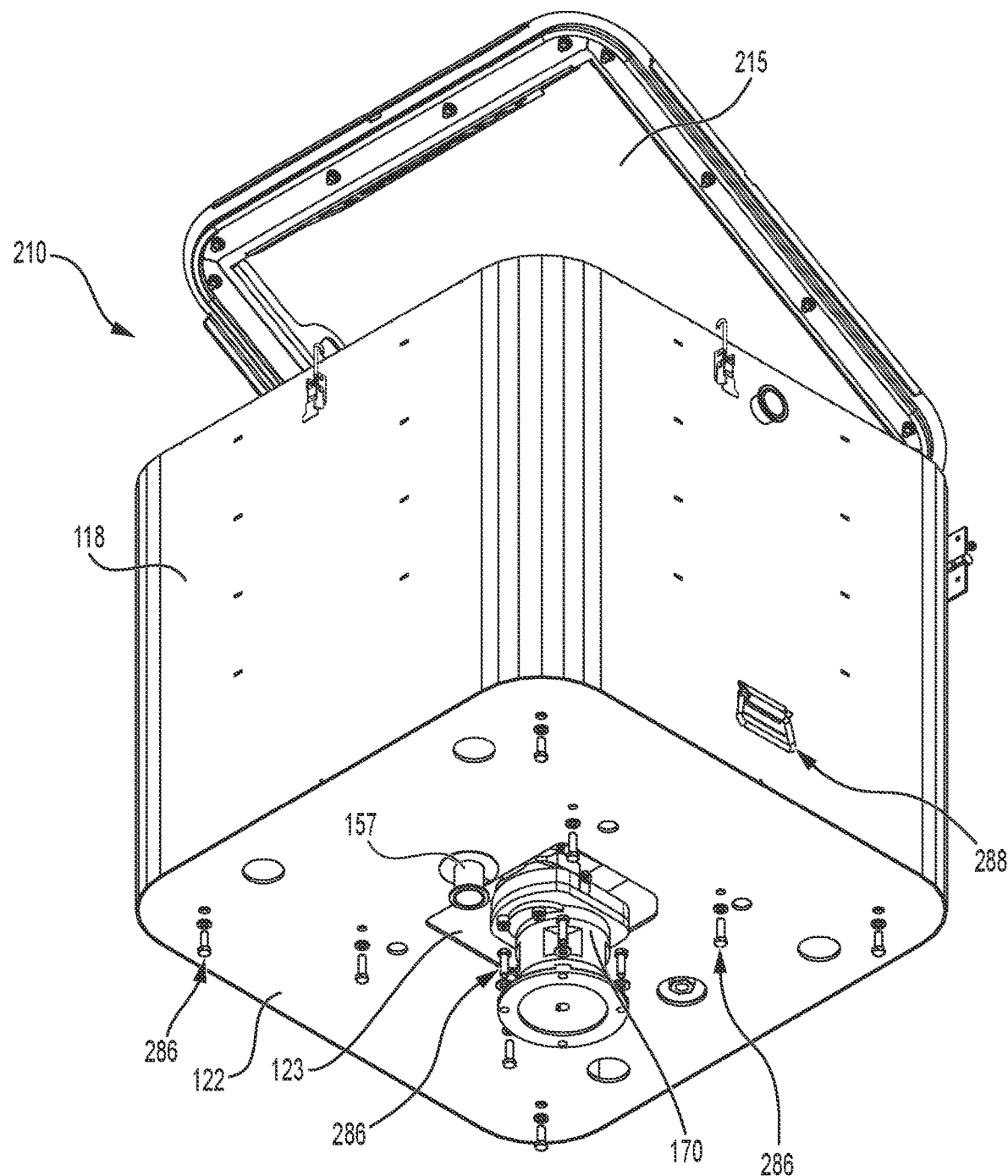
FIG. 14 shows a bottom perspective view of the washer tub of FIG. 9.
Figure 15:
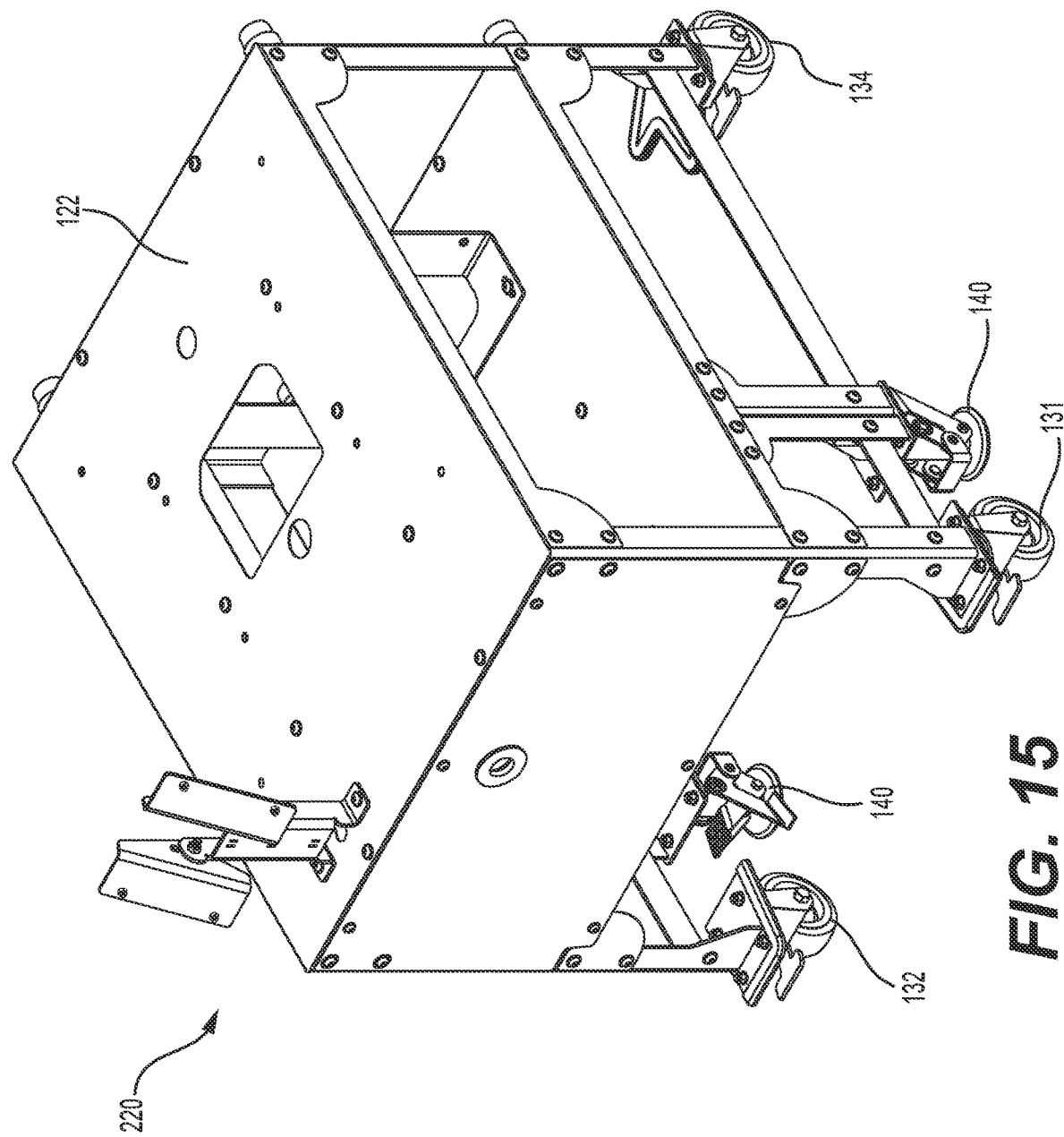
FIG. 15 shows a stand for use with a washer tub for making resin solutions, in an embodiment.

FIG. 9 shows a top perspective view of an exemplary washer tub 210; FIG. 10 shows an exemplary fluid loop arrangement for use in washer tub 210; FIG. 11 shows a top-down view of washer tub 210; FIG. 12 shows a side view of washer tub 210; FIG. 13 shows a bottom view of washer tub 210 without a motor installed; FIG. 14 shows a bottom perspective view of washer tub 210; and, FIG. 15 shows a stand 220 for use with washer tub 210. FIGS. 9-15 are best viewed together with the following description. Washer tub 210 of FIGS. 9-15 is an example of the washer tub 110 shown in FIGS. 1-7 with modifications, as described below. Items enumerated in FIGS. 9-15 with like numbering from FIGS. 1-7 are essentially the same or similar and their description may not be repeated accordingly.

As shown in FIG. 9, washer tub 210 includes a clear lid 215. Clear lid 215 is an example of cover 115 of FIG. 1. Clear lid 215 is made of a substantially transparent material to enable viewing inside washer tub 210 while the lid is closed. In an embodiment, clear lid 215 is made of an optically clear and substantially transparent material such as plexiglass or polycarbonate. A gas spring 298 is mounted to a back outer wall of washer tub 210 and pivotally coupled to clear lid 215 via a bracket (see also FIG. 12). Gas spring 298 is configured to provide a soft close of clear lid 215, such that when released from a partially or fully open position clear lid 215 closes in a smooth and quiet manner, as opposed to slamming shut. Gas spring 298 may include a 1.5-inch diameter bore air cylinder, for example.

As depicted in FIG. 9, a first port 291 provides a fluid inlet and second port 292 provides a fluid outlet for a cooling fluid, as described above in connection with FIG. 4. In the embodiment depicted in FIG. 9, first port 291 is located higher than second port 292 such that cooling fluid flows via gravity through a fluid circulation loop that wraps around washer tub 210 between its inner and outer walls. An exemplary fluid circulation loop is described below in connection with FIG. 11.

FIG. 10 shows a top-down view of washer tub 210 including a perforated floor 219. Perforated floor 219 is an example of upper floor 119 of FIG. 7 configured to provide a false bottom of washer tub 210. In an embodiment, perforated floor 219 is made of stainless steel and includes a plurality of small through-holes (e.g., ⅜-inch diameter). The corners of washer tub 210 are rounded, which avoids having an acutely angled corner inside the washer tub basin and also avoids tight bends in fluid circulation loop 290. In embodiments, the corners of inner wall 117 each have a radius of curvature ranging from about 1-inch to about 6-inches, and the corners of outer wall 118 each have a radius of curvature ranging from about 2-inches to about 12-inches. In an embodiment, the corners of inner wall 117 each have a radius of curvature of 3-inches, and the corners of outer wall 118 each have a radius of curvature of 4¹⁄₁₆ inches.

FIG. 10 shows a fluid circulation loop 290 installed between inner wall 117 and outer wall 118. Outer wall 118 is partially removed in FIG. 11 to enable viewing of fluid circulation loop 290. Clear lid 215 and other components are also removed from washer tub 210 in FIG. 11 for clarity of illustration. Fluid circulation loop 290 includes individual wraps of material (e.g., stainless steel) arranged in a stackup. In embodiments, the individual wraps of material are sloped to maintain flow of cooling fluid downwardly around the tub and to the second port 192. In other embodiments, the individual wraps are substantially horizontal and the cooling fluid enters under pressure and maintains momentum as it flows from one row to the next down to the drain. In some embodiments, cooling loops are used to provide fluid circulation loop 290. The cooling loops may include tubing, coils, or other means of circulating a cooling fluid between inner wall 117 and outer wall 118. A rim 293 is mechanically coupled to a top edge of inner wall 117 and outer wall 118 to enclose fluid circulation loop 290. In FIG. 11, perforated floor 219 is removed to provide a view of lower floor 121, which includes a central hole for an impeller well 173. Impeller well 173 is adapted for housing an impeller (e.g., impeller 172 described above in connection with FIG. 4). Impeller well 173 is further described below in connection with FIG. 13.

FIG. 12 shows a cross-sectional side view of washer tub 210. The cross-section shown in FIG. 12 is taken from the line marked A-A' in FIG. 10. Motor 170 is shown installed beneath impeller well 173. Drive shaft 174 extends from motor 170 into impeller well 173 for driving an impeller (not shown in FIG. 12). Thermal well 196 includes temperature sensor 195, as described above in connection with FIGS. 4 and 5, communicatively coupled with controller 160 (see FIG. 8) for providing internal temperature information for washer tub 210. In washer tub 210, thermal well 196 is a protrusion formed in lower floor 121. The protrusion may be formed by a bump-out process to provide a recess accessed from below lower floor 121.

FIG. 13 shows a bottom view of washer tub 210 without motor 170 installed. A bottom of impeller well 173 is configured with holes 281 for mounting motor 170 and a central hole 282 for receiving drive shaft 174. A plurality of brackets 285 are provided around the perimeter of impeller well 173 for mounting impeller well 173 to lower floor 121. Not all holes 281 and brackets 285 are enumerated in FIG. 13 for clarity of illustration.

FIG. 14 shows a bottom perspective view of washer tub 210 with clear lid 215 partially open. An opening 123 in bottom panel 122 is configured to receive motor 170. A plurality of bolts 286 are shown in exploded view for mounting motor 170 and bottom panel 122. A pull handle 288 is mechanically coupled to outer wall 118. An additional pull handle is provided on the opposite side out of view in FIG. 14.

FIG. 15 shows stand 220 for use with washer tub 210. Stand 220 is an example of stand 120, FIGS. 1-4, 6, and 7. Bottom panel 122 is mounted to stand 220 (via bolts, for example). Stand 220 includes two floor locks 140 and four wheels 131-134.

Figure 16:
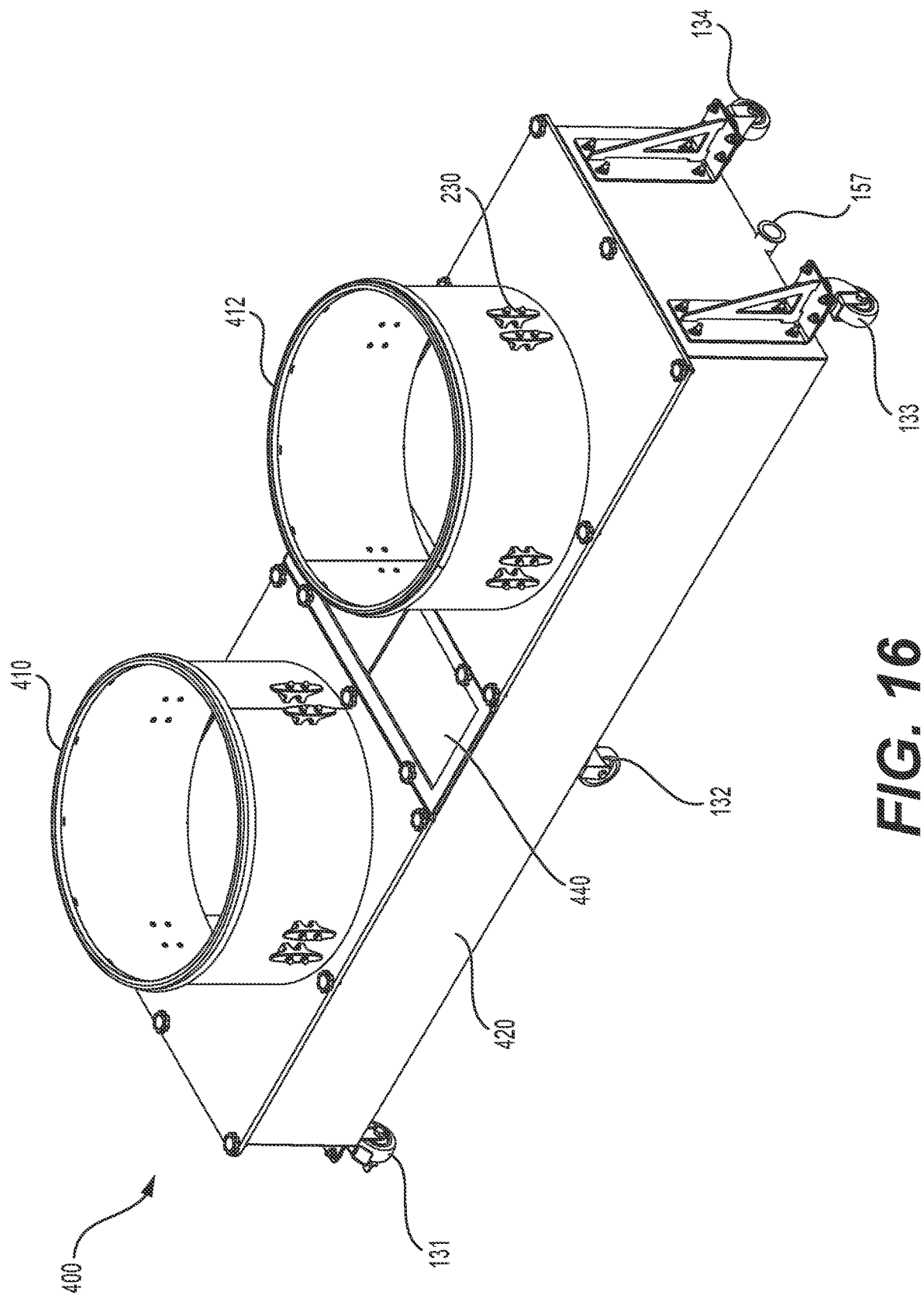
FIG. 16 shows a perspective view of a system for making resin solutions, in an embodiment.
Figure 17:
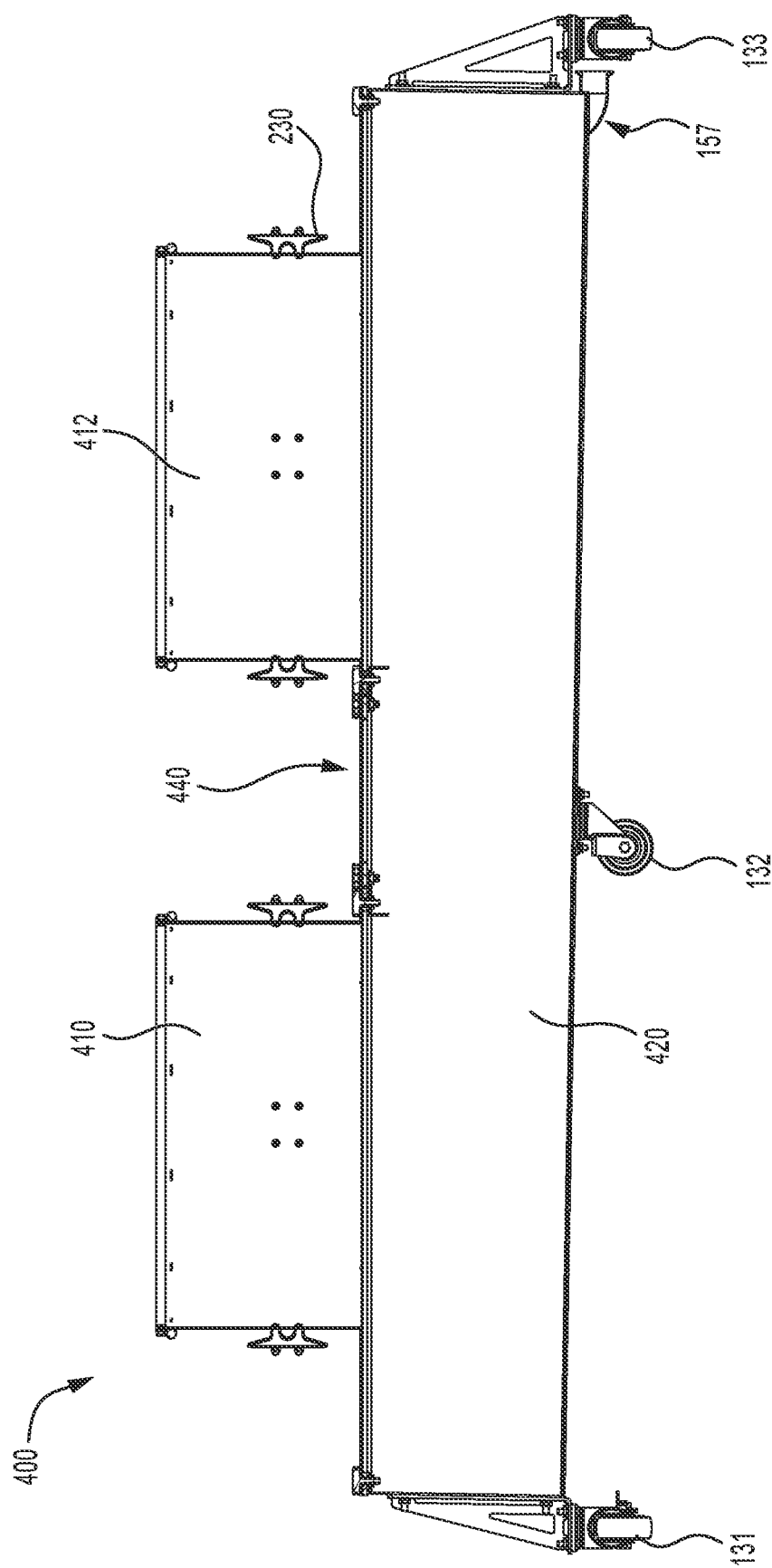
FIG. 17 shows a side view of the system of FIG. 16.

FIG. 16 shows a top perspective view of an exemplary double basin filtering system 400 for filtering resin solutions. FIG. 17 shows a side view of system 400. FIGS. 16-17 are best viewed together with the following description. Items enumerated in FIGS. 16-17 with like numbering from FIGS. 1-15 are essentially the same or similar and their description may not be repeated accordingly.

System 400 of FIGS. 16 and 17 includes a first filter tub 410 and a second filter tub 412. System 400 is configured for use with washer tub 110 or washer tub 210, for example. Specifically, plant material and the washing liquid used to wash the plant material may be moved from washer tub 110 or washer tub 210 to one or both of filter tubs 410, 412 for filtering resin from the plant material and optionally for filtering out plant material from the mixture. Having two filtering tubs doubles the throughput for filtering plant material. In embodiments, system 400 has two filter tubs 410, 412 for receiving washed plant material from two washer tubs (110 or 210) simultaneously. First and second filter tubs 410, 412 are substantially cylindrical (e.g., having a circular cross-section as viewed from above or below) and may have a single wall and be non-insulated. Alternatively, first and second filter tubs 410, 412 are double-walled with an inner wall and an outer wall, similar to washer tub 110 and washer tub 210 described above. Insulating material may be provided between the inner and outer walls for helping to maintain a temperature of the contents of the washer tubs. Alternatively, a fluid circulation loop may be provided (e.g., similar to fluid circulation loop 290 of FIG. 10) to actively control the temperature of the washer tubs.

In some embodiments, first and second filter tubs 410, 412 lack a floor and instead a filter bag is located at the bottom opening of each filter tub. Alternatively, first and second filter tubs 410, 412 each have a floor that is slightly sloped towards a drain, and a filter may be positioned beneath the drain for filtering plant materials. In embodiments, the filter or filter bag comprises a nylon mesh filter. In some embodiments, the filter or filter bag comprises micron-sized holes. One or more rope cleats 230 may be mounted to the outer wall of first and second filter tubs 410, 412 for tying filters or filter bags thereto.

In embodiments, first and second filter tubs 410, 412 are each configured to hold filter bags. The filter bags are used to capture resins and filter out other plant material from the wash liquid (e.g., water). The wash liquid may then be pumped back into first and second filter tubs 410, 412 for reuse. Advantages of system 400 include a water recycling system with a small footprint to save space and a closed-loop water management system for seamlessly recycling water.

A reservoir 420 is provided beneath first and second filter tubs 410, 412. Reservoir 420 may be used for recycling water used for filtering resin and plant material. For example, water used in the filter tubs 410, 412 may be drained into reservoir 420, where it is stored for later reuse. When filter bags are installed in the bottom of each filter tub 410, 412, the water is filtered as it flows into reservoir 420 thereby filtering the water for reuse. Reservoir 420 includes a sloped floor with drain 157 located beneath the bottom of the lower slope of the tank floor for draining the tank (see FIG. 17). The sloped floor may be sloped at an angle of about 1-degree, for example. In embodiments, reservoir 420 provides an 80-gallon capacity tank and is made of stainless steel. As best viewed in FIG. 16, a removable lid 440 is included for providing access to reservoir 420. In embodiments, removable lid 440 is made of a transparent material, such as a clear plexiglass. A gasket may be disposed between removable lid 440 and reservoir 420 to create a water-tight seal. In embodiments, the gasket is a ¼-inch neoprene gasket. A plurality of wheels (e.g., six) are provided, although not all wheels are shown for clarity of illustration. For example, wheels 131-134 are depicted, which are the same or similar to wheels 131-134 of FIGS. 1-4, described above.

Figure 18:
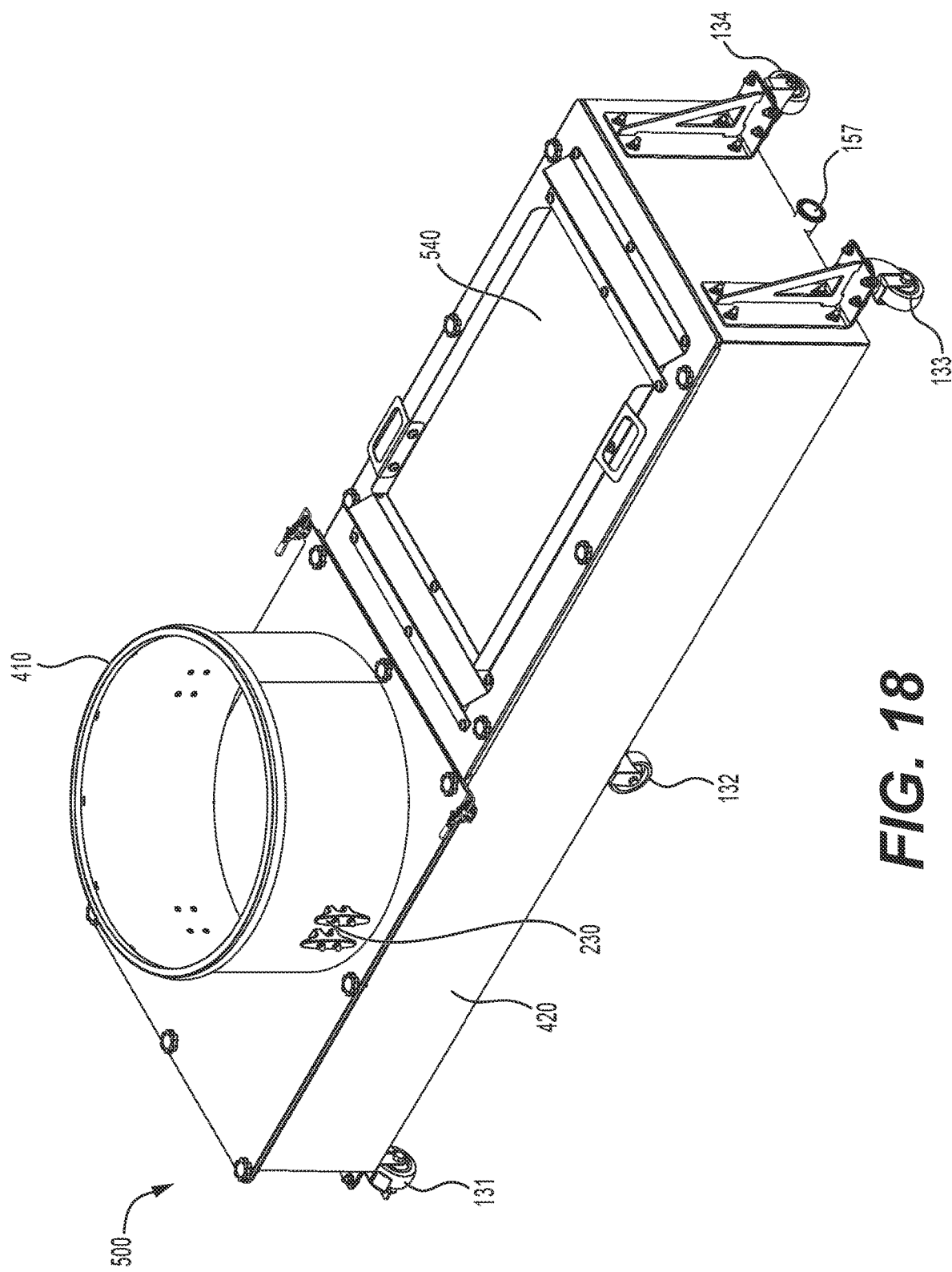
FIG. 18 shows a perspective view of a system for making resin solutions, in an embodiment.
Figure 19:
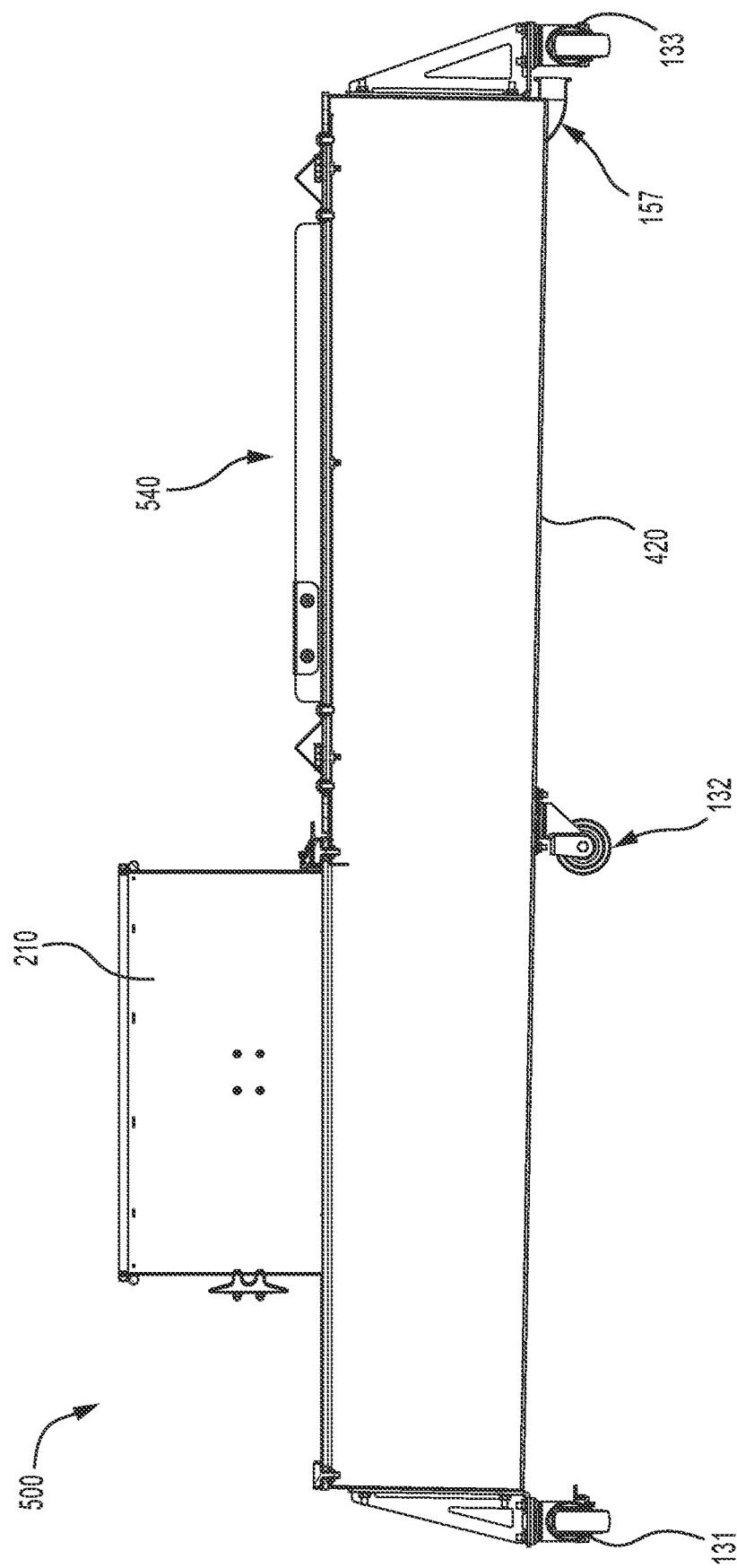
FIG. 19 shows a side view of the system of FIG. 18.

FIG. 18 shows a top perspective view of an exemplary system 500 for filtering resin solutions. FIG. 19 shows a side view of system 500. FIGS. 18-19 are best viewed together with the following description. Items enumerated in FIGS. 18-19 with like numbering from FIGS. 1-17 are the same or essentially the same and their description may not be repeated accordingly.

System 500 of FIGS. 18 and 19 includes first filter tub 410, described above in connection with FIGS. 16 and 17, but does not include second filter tub 412. Instead, a lid 540 is provided. Lid 540 is an example of lid 440 of FIG. 16, described above. However, lid 540 is larger in both length and width compared to lid 440 of FIG. 16. Lid 540 also includes handles to assist with removal and reinstallation. System 500 is configured for filtering resin from plant material and optionally to remove plant material from wash liquid (e.g., water) for recycling the wash liquid. An advantage of systems 400 and 500 is that they are configured for moving via wheels 131-134, e.g., into a walk-in refrigerator.

Many different arrangements of the various components depicted, as well as components not shown, are possible without departing from the scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Not all operations listed in the various figures need be carried out in the specific order described.

The invention claimed is:

1. A system for making resin solutions, comprising:
   a washer tub, comprising:
     an inner wall;
     an outer wall aligned parallel with the inner wall and spaced apart from the inner wall by a gap such that both the inner wall and outer wall have a substantially square cross-sectional shape with rounded corners; and
     a sloped floor disposed within the inner wall,
     wherein the inner wall, the outer wall and the sloped floor form a basin;
   a fluid circulation loop disposed in the gap between the inner wall and the outer wall, wherein the fluid circulation loop wraps around the inner wall more than once;
   an impeller centrally disposed above the sloped floor, wherein the impeller comprises a no-shear impeller comprising blades each having an approximately 65-degree sloped wall to provide low drag;
   an electric motor mechanically coupled with the impeller for rotating the impeller;
   a controller communicatively coupled with the electric motor for controlling rotation of the impeller via the electric motor; and
   a user interface communicatively coupled with the controller for receiving instructions comprising an operating cycle of the impeller.

2. The system of claim 1 comprising:
   a thermal well located along an interior surface of the washer tub; and
   a temperature sensor disposed inside the thermal well,
   wherein the controller is configured to receive temperature data from the temperature sensor and the user interface is configured to display a current temperature based on the temperature data.

3. The system of claim 2 comprising:
   a fluid for circulating through the fluid circulation loop;
   wherein the user interface is configured to receive a desired temperature input; and
   the controller is configured to transmit the desired temperature input to a temperature control device for adjusting a temperature of the fluid to the desired temperature.

4. The system of claim 3 comprising:
   an inlet port and an outlet port, wherein the inlet port and the outlet port are each accessible from outside the outer wall and fluidly coupled to the fluid circulation loop;
   wherein the inlet port is fluidly coupled to a top of the fluid circulation loop and the outlet port is fluidly coupled to a bottom of the fluid circulation loop, and
   the fluid circulation loop is angled downwardly from the inlet port such that the fluid flows via gravity to the outlet port.

5. The system of claim 1 wherein the impeller comprises a semi-closed impeller having a solid back wall and a plurality of fins that extend from the solid back wall.

6. The system of claim 5 wherein the plurality of fins are substantially rounded to lack sharp edges such that the impeller is configured to stir contents of the washer tub without causing damage.

7. The system of claim 1 comprising a motor driver configured to activate the electric motor and to control a speed of the electric motor and to transmit data about the motor to the controller.

8. The system of claim 1 wherein the electric motor comprises a 1-horsepower electric motor operated using 110-Volt AC electrical power.

9. The system of claim 1 comprising an insulating material disposed between the inner wall and the outer wall.

10. The system of claim 1 wherein in the sloped floor comprises an upper floor and a lower floor separated by a gap.

11. The system of claim 1 comprising:
    a clear lid pivotally coupled to a top of the washer tub; and
    a gas spring mounted to an outside of the outer wall pivotally coupled to the clear lid, wherein the gas spring is configured to provide a soft close of the clear lid.

12. The system of claim 1 wherein the impeller comprises a machined aluminum material treated with a hard anodizing surface coating to make an outside surface of the impeller hardened.

13. The system of claim 1 wherein the impeller is mechanically coupled to the electric motor via a threaded shaft and a nut such that the impeller is easily removable.

14. A system for making resin solutions, comprising:
    a washer tub, comprising:
      an inner wall;
      an outer wall aligned outside the inner wall and spaced apart from the inner wall by a gap; and
      a sloped floor disposed within the inner wall,
      wherein the inner wall, the outer wall and the sloped floor form a basin comprising a square cross-sectional shape with four rounded corners;

a fluid circulation loop disposed in the gap between the inner wall and the outer wall, wherein the fluid circulation loop wraps around the inner wall more than once;

an impeller centrally disposed above the sloped floor;

an electric motor mechanically coupled with the impeller for rotating the impeller;

a controller communicatively coupled with the electric motor for controlling rotation of the impeller via the electric motor; and a user interface communicatively coupled with the controller for receiving instructions comprising an operating cycle of the impeller, wherein the impeller comprises a no-shear impeller comprising blades each having an approximately 65-degree sloped wall to provide low drag.

* * * * *